United States Patent
Ware et al.

(10) Patent No.: US 9,411,678 B1
(45) Date of Patent: Aug. 9, 2016

(54) DRAM RETENTION MONITORING METHOD FOR DYNAMIC ERROR CORRECTION

(71) Applicant: Rambus Inc., Sunnyvale, CA (US)

(72) Inventors: Frederick A. Ware, Los Altos Hills, CA (US); Suresh Rajan, Fremont, CA (US); Ely Tsern, Los Altos, CA (US); Thomas Vogelsang, Mountain View, CA (US); Wayne Ellis, Campbell, CA (US)

(73) Assignee: Rambus Inc., Sunnyvale, CA (US)

( * ) Notice: Subject to any disclaimer, the term of this patent is extended or adjusted under 35 U.S.C. 154(b) by 242 days.

(21) Appl. No.: 13/828,828

(22) Filed: Mar. 14, 2013

Related U.S. Application Data

(60) Provisional application No. 61/678,544, filed on Aug. 1, 2012.

(51) Int. Cl.
  *H03M 13/00* (2006.01)
  *G06F 11/10* (2006.01)

(52) U.S. Cl.
  CPC .................................. G06F 11/1008 (2013.01)

(58) Field of Classification Search
  CPC ............... G11C 7/1045; G11C 11/406; G11C 11/40618; G11C 11/40615; G11C 7/1006; G11C 2211/4062; G11C 2029/0411; G11C 2211/4061; G06F 11/1052
  USPC ...................................... 714/42, E11.05, 785
  See application file for complete search history.

(56) References Cited

U.S. PATENT DOCUMENTS

| | | |
|---|---|---|
| 4,139,148 A | 2/1979 | Scheuneman et al. |
| 4,748,627 A | 5/1988 | Ohsawa |
| 5,315,552 A | 5/1994 | Yoneda |
| 5,644,541 A | 7/1997 | Siu et al. |
| 5,758,056 A | 5/1998 | Barr |
| 5,781,717 A | 7/1998 | Wu et al. |
| 5,838,603 A | 11/1998 | Mori et al. |
| 5,910,921 A | 6/1999 | Beffa et al. |
| 6,182,257 B1 | 1/2001 | Gillingham |
| 6,754,117 B2 | 6/2004 | Jeddeloh |
| 6,873,555 B2 | 3/2005 | Hiraki et al. |
| 7,379,361 B2 | 5/2008 | Co et al. |
| 7,444,577 B2 | 10/2008 | Best et al. |
| 7,464,225 B2 | 12/2008 | Tsern |
| 7,478,285 B2 | 1/2009 | Fouquet-Lapar |
| 7,487,428 B2 | 2/2009 | Co et al. |
| 7,522,464 B2 | 4/2009 | Yoo et al. |
| 7,565,479 B2 | 7/2009 | Best et al. |
| 7,565,593 B2 | 7/2009 | Dixon et al. |

(Continued)

OTHER PUBLICATIONS

Barber, Alan, et al, "A Bare-Chip Probe for High I/O, High Speed Testing", HPL-94-18, Mar. 1994, Hewlett-Packard. 19 pages.

(Continued)

*Primary Examiner* — Guy Lamarre
(74) *Attorney, Agent, or Firm* — Lance Kreisman; Peninsula Patent Group

(57) ABSTRACT

A method of operation in a memory device, comprising storing data in a first group of storage locations in the memory device, storing error information associated with the stored data in a second group of storage locations in the memory device, and selectively evaluating the error information based on a state of an error enable bit, the state based on whether a most recent access to the first group of storage locations involved a partial access.

18 Claims, 18 Drawing Sheets

(56) References Cited

U.S. PATENT DOCUMENTS

| | | | |
|---|---|---|---|
| 7,619,938 | B2 | 11/2009 | Co et al. |
| 7,734,866 | B2 | 6/2010 | Tsern |
| 7,961,542 | B2 | 6/2011 | Smith |
| 8,023,350 | B2 | 9/2011 | Bunker et al. |
| 8,024,638 | B2 | 9/2011 | Resnick et al. |
| 8,132,086 | B2 | 3/2012 | Park et al. |
| 8,386,833 | B2 | 2/2013 | Smith et al. |
| 2002/0120887 | A1 | 8/2002 | Hughes et al. |
| 2002/0124203 | A1 | 9/2002 | Fang |
| 2004/0261049 | A1 | 12/2004 | Mohr et al. |
| 2005/0041502 | A1 | 2/2005 | Perner |
| 2006/0271755 | A1 | 11/2006 | Miura |
| 2007/0033338 | A1 | 2/2007 | Tsern |
| 2007/0109856 | A1 | 5/2007 | Pellicone et al. |
| 2007/0220354 | A1* | 9/2007 | Moyer ............... 714/42 |
| 2008/0195894 | A1 | 8/2008 | Schreck et al. |
| 2008/0266990 | A1 | 10/2008 | Loeffler |
| 2009/0024884 | A1 | 1/2009 | Klein |
| 2009/0249169 | A1* | 10/2009 | Bains et al. ............... 714/766 |
| 2009/0316501 | A1 | 12/2009 | Bunker et al. |
| 2010/0208537 | A1 | 8/2010 | Pelley, III et al. |
| 2010/0293437 | A1 | 11/2010 | Gollub et al. |
| 2011/0138251 | A1 | 6/2011 | Pawlowski |
| 2012/0221902 | A1 | 8/2012 | Ware et al. |
| 2012/0281348 | A1 | 11/2012 | Harashima et al. |
| 2013/0058145 | A1 | 3/2013 | Yu et al. |

OTHER PUBLICATIONS

International Search Report and Written Opinion dated Dec. 27, 2012 in International Application No. PCT/US2012/061212. 8 pages.

Niggemeyer, D. et al, "A Defect-Tolerant DRAM Employing a Hierarchical Redundancy Scheme, Built-In Self-Test and Self-Reconfiguration", Proceedings, International Workshop on Memory Technology, Design and Testing, Aug. 11-12, 1997, Conference Publications pp. 33-40. 8 pages.

PCT Search Report and Written Opinion dated Jul. 1, 2011 re Int'l. Application No. PCT/US2010/056217. 9 Pages.

Preliminary Report on Patentability (Chapter I of the PCT) dated May 31, 2012 in International Application No. PCT/US2010/056217. 8 pages.

Sun, Hongbin et al., "Cost-efficient built-in repair analysis for embedded memories with on-chip ECC," 2011 1st International Symposium on Access Spaces (ISAS), pp. 95,100, Jun. 17-19, 2011. 6 pages.

Wu, Tze-Hsin et al. "A memory yield improvement scheme combining built-in self-repair and error correction codes," 2012 IEEE International Test Conference (ITC), pp. 1-9, Nov. 5-8, 2012. 9 pages.

* cited by examiner

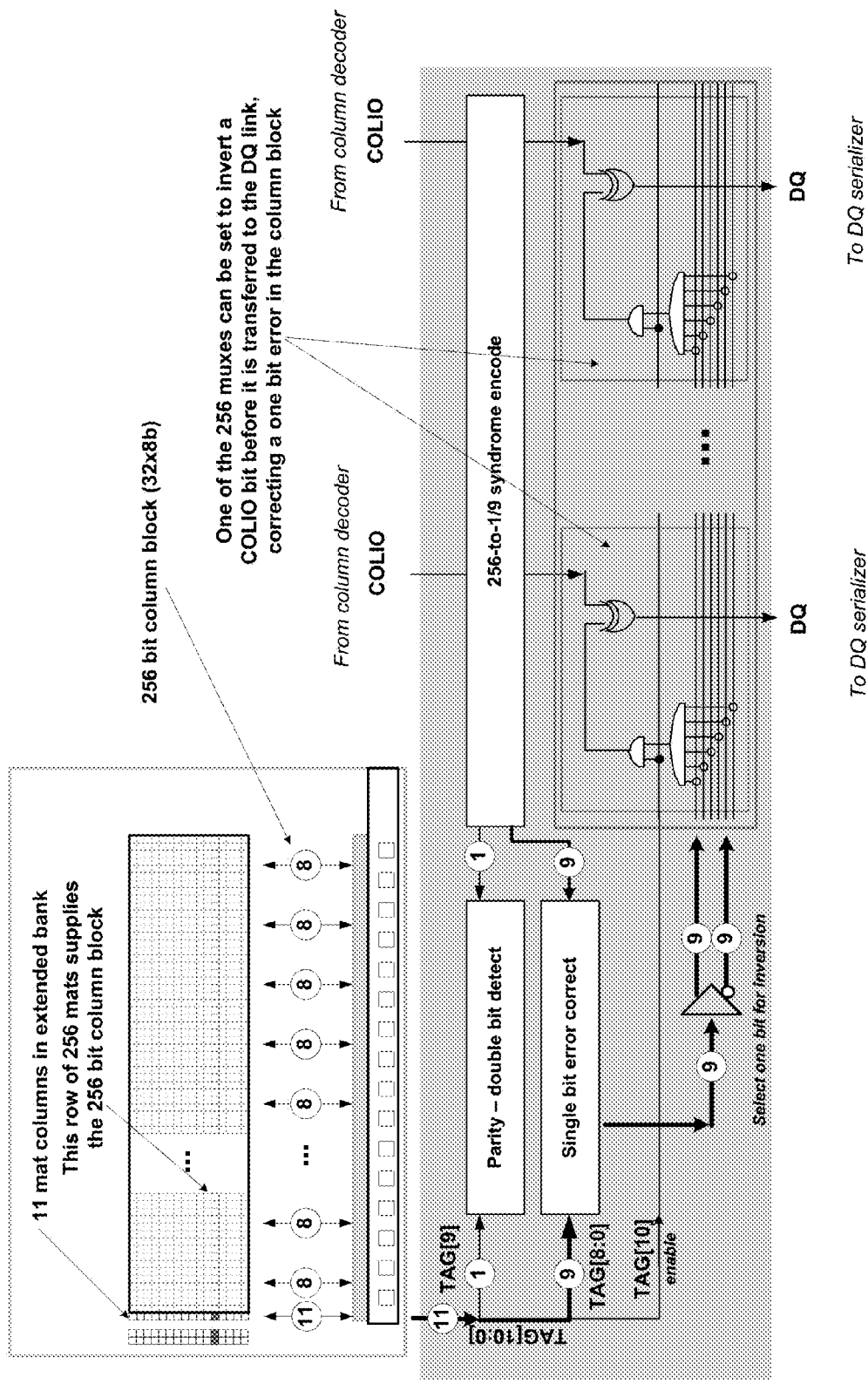

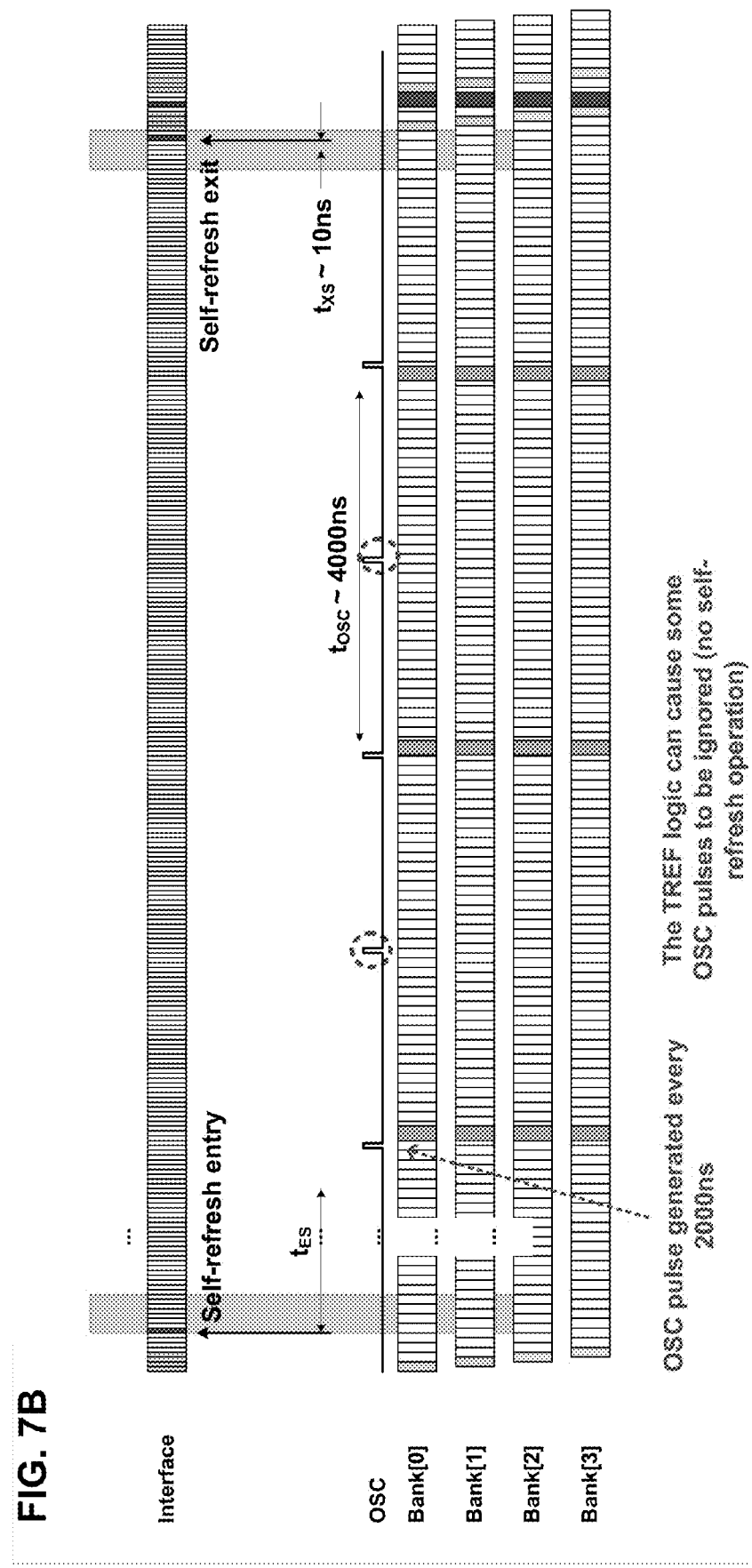

DRAM RETENTION MONITORING METHOD FOR DYNAMIC ERROR CORRECTION

CROSS-REFERENCE TO RELATED APPLICATIONS

This application claims the benefit of priority under 35 U.S.C. §119(e) to Provisional Application Ser. No. 61/678,544, filed Aug. 1, 2012, titled DRAM RETENTION MONITORING METHOD FOR DYNAMIC ERROR CORRECTION, which is incorporated herein by reference in its entirety.

BACKGROUND

As lithographic feature size is reduced in successive generations of dynamic random access memory components (DRAM), the capacitance of individual storage cells is reduced. The leakage current of the access transistor element increases in each successive generation because of the reduction in gate threshold voltage. The retention time of a dynamic storage cell is proportional to the storage capacitance divided by leakage current. Consequently, the trend is for the average retention time to decrease at each process generation.

Each storage cell must be refreshed periodically by sensing a row and rewriting it—the parameter for the interval between successive sensing operations is called the refresh time, or tREF. The tREF interval must be less than the retention time interval of every storage cell on each DRAM component.

A DRAM component is tested for the tREF parameter at the time of manufacture. This testing is performed at worst case temperature and supply voltage. If the retention time of a storage cell degrades after it has been manufactured, the DRAM (and a module or board into which it is soldered) will become unusable. Among other things, a method of detecting storage cells with degraded retention times and correcting for them is disclosed in various embodiments in this description.

Embodiments herein monitor the retention time of a memory device by checking each access for errors. In this manner, all rows may be effectively tested in parallel. The testing described herein also has little-to-no impact on DRAM performance since live data in the rows does not need to be moved by the retention monitoring process. When the retention monitoring process discovers a storage cell with a degraded retention time, it will update the repair map for a repair method.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 6C illustrates one embodiment of the monitor logic of FIG. 6A;

FIG. 7B illustrates an example of the DRAM transitioning between normal operation and self-refresh operation; and, FIG. 8 illustrates the timing of selected signals involved with the memory controller of FIG. 1, including data mask DM pin functionality.

DETAILED DESCRIPTION

Overview of Monitoring Method

Figure 1:
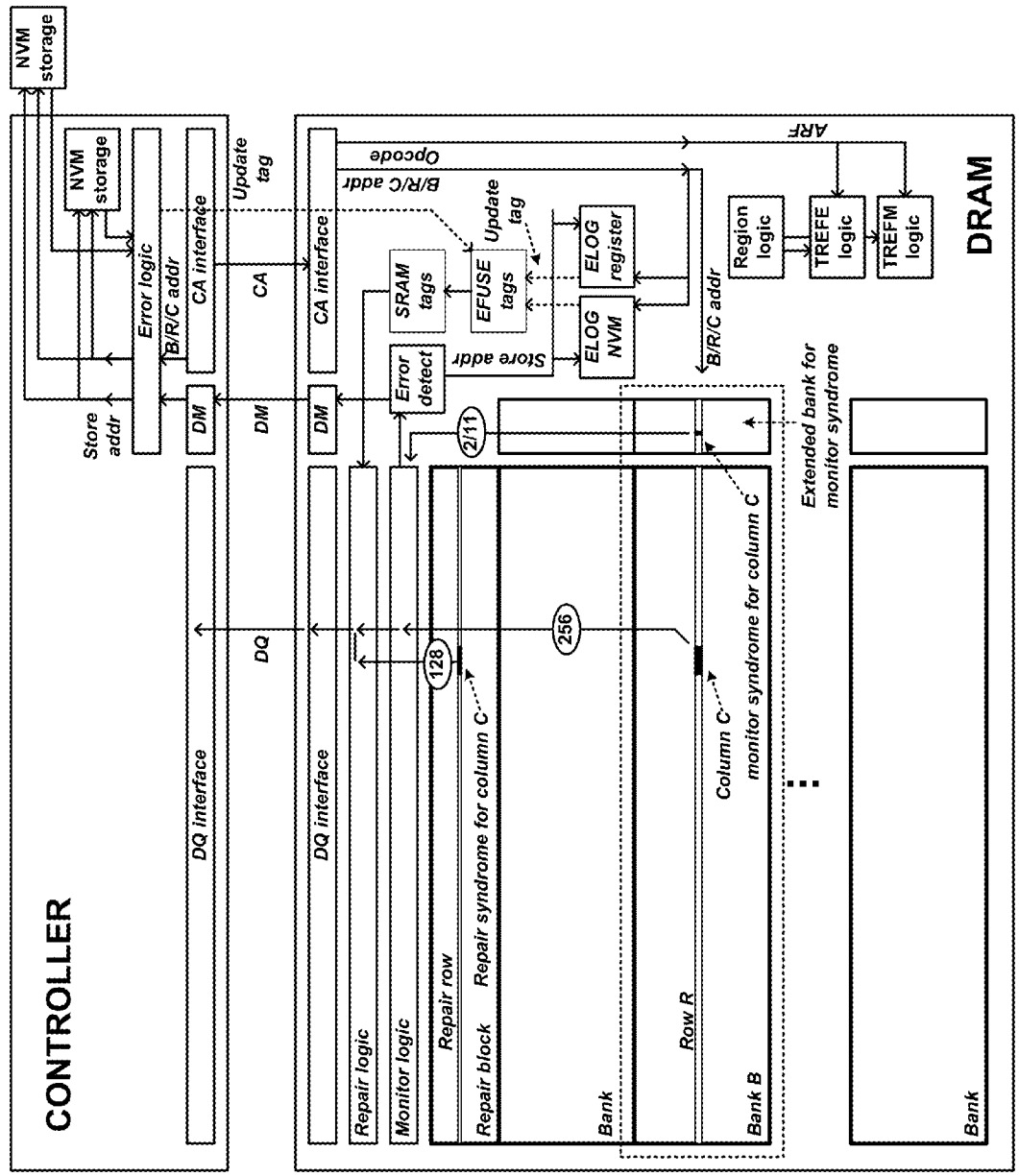
FIG. 1 illustrates a controller component ("CONTROLLER") and a DRAM memory component ("DRAM")

FIG. 1 shows two components: A controller component "CONTROLLER", and a DRAM memory component "DRAM". Enough internal detail is shown so that this figure can be used to describe the retention monitoring process and certain elements.

In an embodiment, the controller and DRAM components are coupled via "DQ" (data) links, "DM" (data mask) links, and "CA" (command address) links. The CA links are typically unidirectional, with command and address information transmitted by the controller and received by the memory. The DQ and DM links are typically bidirectional, with data and mask information transmitted by the controller and received by the memory for a write operation, and with data and mask information transmitted by the memory and received by the controller for a read operation.

The memory component contains an array of storage cells. These are arranged as blocks of column addresses in rows, with the rows arranged into independent banks. In an example, each read or write operation accesses a column block of 256 storage cells. Each row consists of 64 column blocks (16K storage cells). Each bank consists of 32K rows, and the entire DRAM memory contains 8 banks (4G storage cells).

At the top of the core is a structure labeled "repair block". This is formed from a set of a spare rows physically located at the top and bottom of each bank. These are normally not used for storing data, but instead are used to balance the sense amplifier circuitry when a row is activated (sensed). In some embodiments, these spare rows are used for repair operations.

The storage cells from the repair block are combined with the 256 storage cells of the column block in the structure labeled "Repair logic".

On the right side of the core is a structure labeled "extended bank for monitor syndrome". This structure, according to an embodiment, adds either 2 or 11 storage cells to each of the 256 storage cells comprising a column block. These additional storage cells are accessed with the same timing as the column block, and contain a syndrome for an error detection or error correction method.

This 2-bit or 11-bit syndrome is combined with the 256 bits for the column access in the structure labeled "Monitor logic". If an error is detected, the "Error detect" block saves the bank and row address of the column block with the erroneous storage cell. This address information is later used to update the repair tags held in the "EFUSE tags" (electronic fuse) block, so that the erroneous storage cell will be permanently repaired.

[1] Read Operation to Column C of Row R of Bank B

Figure 2A:
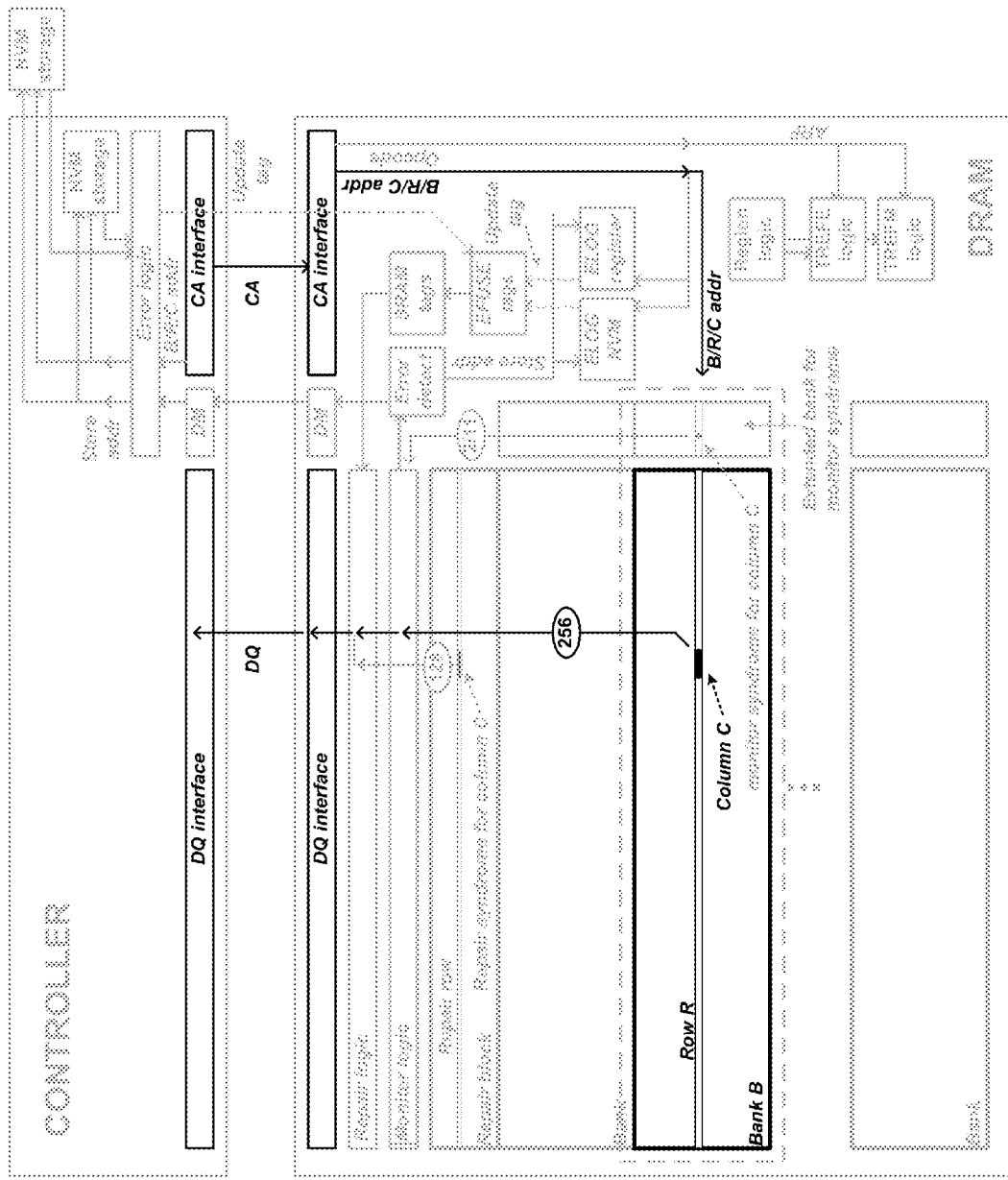
FIG. 2A illustrates an example of a read operation.

FIG. 2A shows an example of a read operation. The controller first issues an activate command (ACT) which causes row R to be activated (sensed) by the sense amplifiers of bank B. A subsequent read command (RD) is issued, and accesses column C of the activated row. The 256 bits that are accessed are transmitted back to the controller via the DQ links. The DM links will typically not be used for a read operation—they are used for write operations to enable/disable the writing of individual 8-bit bytes of a 256 column block.

[2] Read Operation—Extended Bank Containing Monitor Syndrome

Figure 2B:
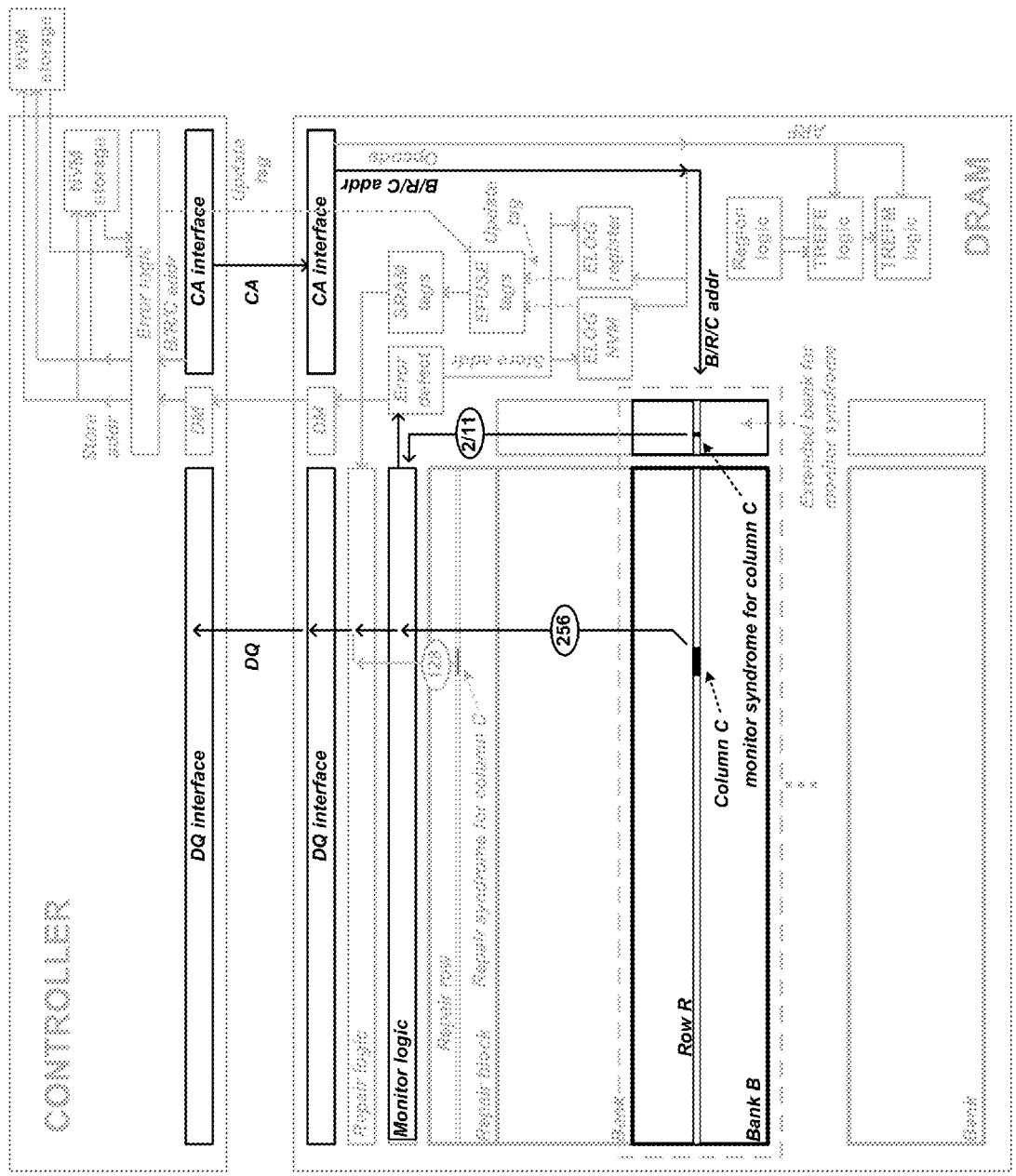
FIG. 2B illustrates the previous read operation with the access extended to include the storage cells of the extended bank.

FIG. 2B shows the previous read operation with the access extended to include the storage cells of the extended bank. The 256 bits from the column location and the 2-bit or 11-bit EDC (error detect or correct) syndrome are combined in the "Monitor logic" block. If there is an error, the signal connected to the "Error detect" block is asserted.

If a 2-bit syndrome is used, then a simple parity check across the 256 column block bits is performed. One of the syndrome bits is a parity bit, and the other is an enable bit, indicating whether a parity check is to be made on that column block. The parity check will detect a single bit error in the block, but will not correct it.

If an 11-bit syndrome is used, then a single-bit-error correction and double-bit error detection across the 256 column block bits is performed. 10 of the syndrome bits perform this correction/detection using a standard Hamming/ECC (error correction code) code. The remaining bit is an enable bit, indicating whether the error check is to be made on that column block. The error check will correct a single bit error in the block, allowing the column data to be returned to the controller. The error check will detect a double bit error in the block, but will not correct it.

Other error detection/correction methods are possible. The two methods described are representative examples of the range of methods that can be used. The DM control signals allow individual 8-bit bytes of a column block to be written, which will invalidate the associated syndrome unless a read-modify-write operation is performed.

This invalidation side-effect is one possible use of the enable bit that is part of the two syndrome formats; when a partial write is performed on a column block with the DM signals, the enable bit of the stored syndrome can simply be disabled.

The enable bit will also typically be used when the DRAM is initially powered-on. It will be set to "disable" for all columns of all rows of all banks to indicate that the initial content of all column blocks is not valid. Alternatively, all column blocks could be written to all zeroes with the syndrome set correctly and the set to "enable".

[3.1] Read Error—Store Address in ELOG Register, Update Tag at PWDN

Figure 3A:
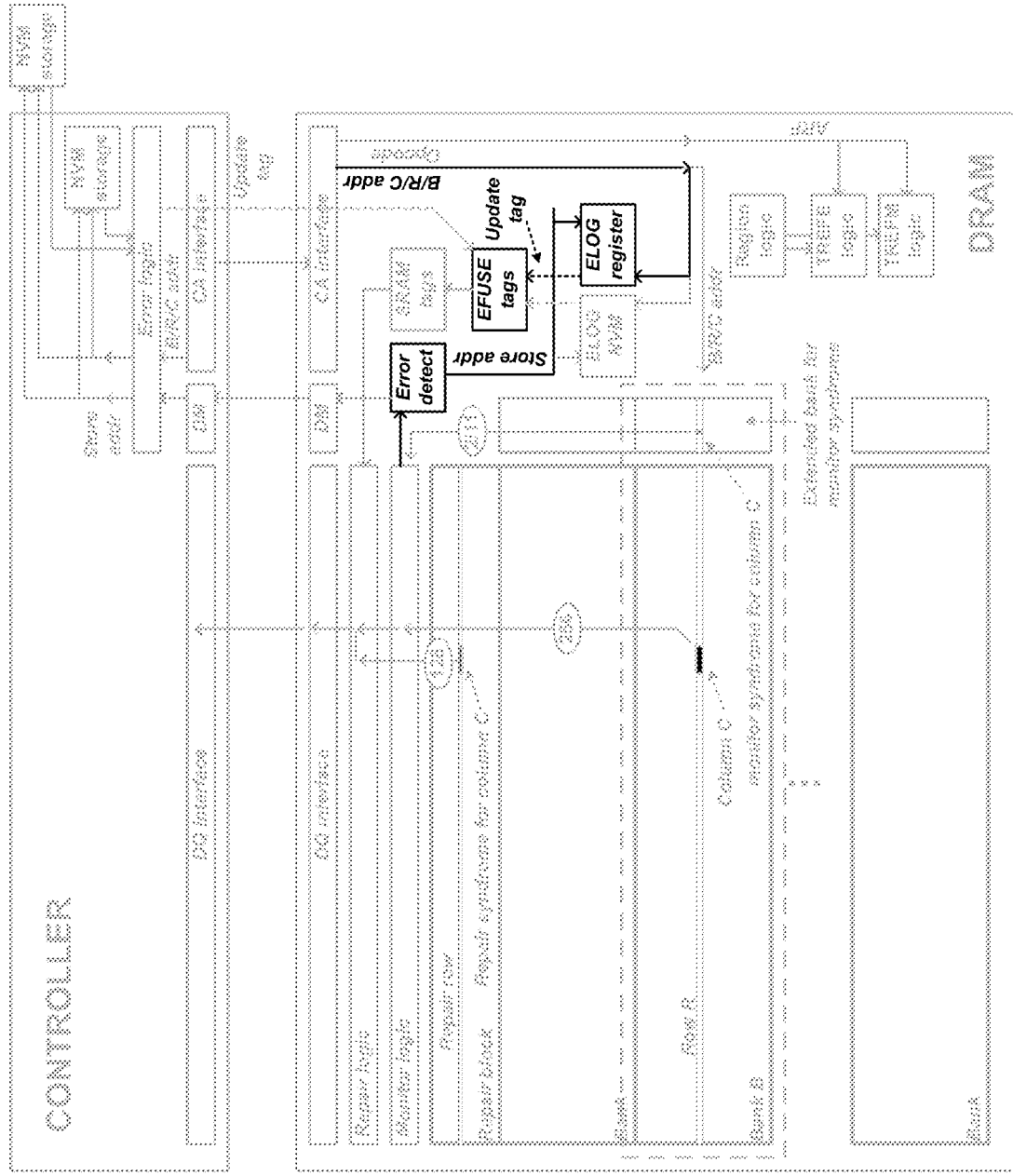
FIG. 3A illustrates the first of three methods of handling the case in which an error is detected (or corrected) after a read operation.

FIG. 3A shows the first of three exemplary methods of handling the case in which an error is detected (or corrected) after a read operation. For this first method, when an error is detected, the "Error detect" block causes the bank and row address (of the column with the error) to be loaded into the "ELOG register". This is a control register with a field that has been previously initialized to a known value indicating no-error. After an error is detected, the field is changed to another value indicating error (along with the bank and row address fields). The no-error and error values should be chosen to be distinguishable from a value that could appear after a power-up event or a power-spike event. This field could include a parity check or other form of error correction/detection to ensure that the error entry does not itself contain an error.

In one embodiment, the ELOG register is volatile, meaning it will lose its contents when power is removed from the memory component. The contents of the ELOG register will generally need to be transferred to the non-volatile "EFUSE tag" structure, so that a permanent repair is made. This transfer can be made while subsequent accesses are being performed; it is expected that the rate of these error detection events will be very low, so a small number of ELOG registers (possibly only one) should be adequate. It is possible that the voltages needed for an EFUSE program operation can be generated internally by the memory component. In this case, the EFUSE transfer can be done immediately.

In other embodiments, the voltage needed for an EFUSE program operation may be supplied from an external source—the controller component, for example. This could be done immediately after the error event by signaling an error with the DM link (FIG. 3C). The generation of this external voltage and the EFUSE programming operation could occur while subsequent accesses are occurring, so that performance is not impacted.

Alternatively, when the DRAM enters a low power state, and power is removed from the DRAM, a PWDN sequence could be modified to generate the external voltage for a specific interval of time. This would give the memory component a window of time to perform the EFUSE transfer if an error event has been logged in the ELOG register.

When an error is detected, the controller carries out certain operations, more fully described below. Generally, the controller is notified that the read data has an error. This may be done with the DM link—the DM control is not typically used during a read operation, and data slots are available. In the case of error detection (not correction) it is likely that the application thread that generated the memory read operation will have to be aborted.

Note that a particular storage location that generates an error that is detected will probably only do so once. It will be repaired as quickly as possible, using one of the policies outlined above, and thereafter should not be repeated.

The controller also undertakes certain operations when an error is corrected, more fully described below. In this case, the controller will receive the correct data, so the application thread may continue. It is possible that the memory will repair the single bit error with the repair block (which will apply a more robust correction code to the entire row). Alternatively, the memory will wait until double bit error detection occurs. This has the disadvantage of losing the read data (and aborting the application thread), but will increase the number of repairable errors by about 5× to 10×. This will be discussed further in Section [4.0].

[3.2] Read Error—Store Address in ELOG NVM, Update Tag at PWDN or PWUP

Figure 3B:
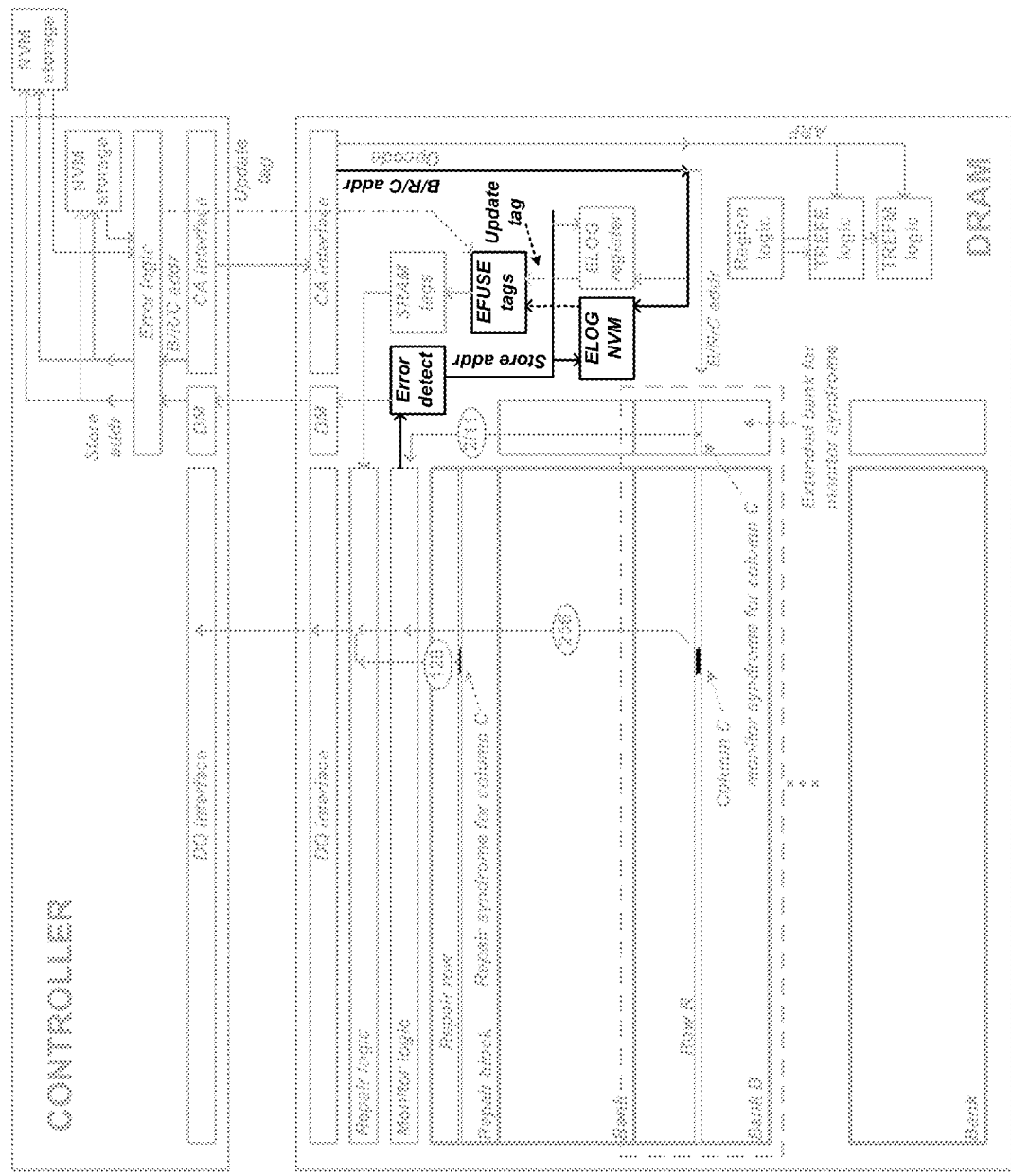
FIG. 3B illustrates the second of three methods of handling the case in which an error is detected (or corrected) after a read operation.
Figure 3C:
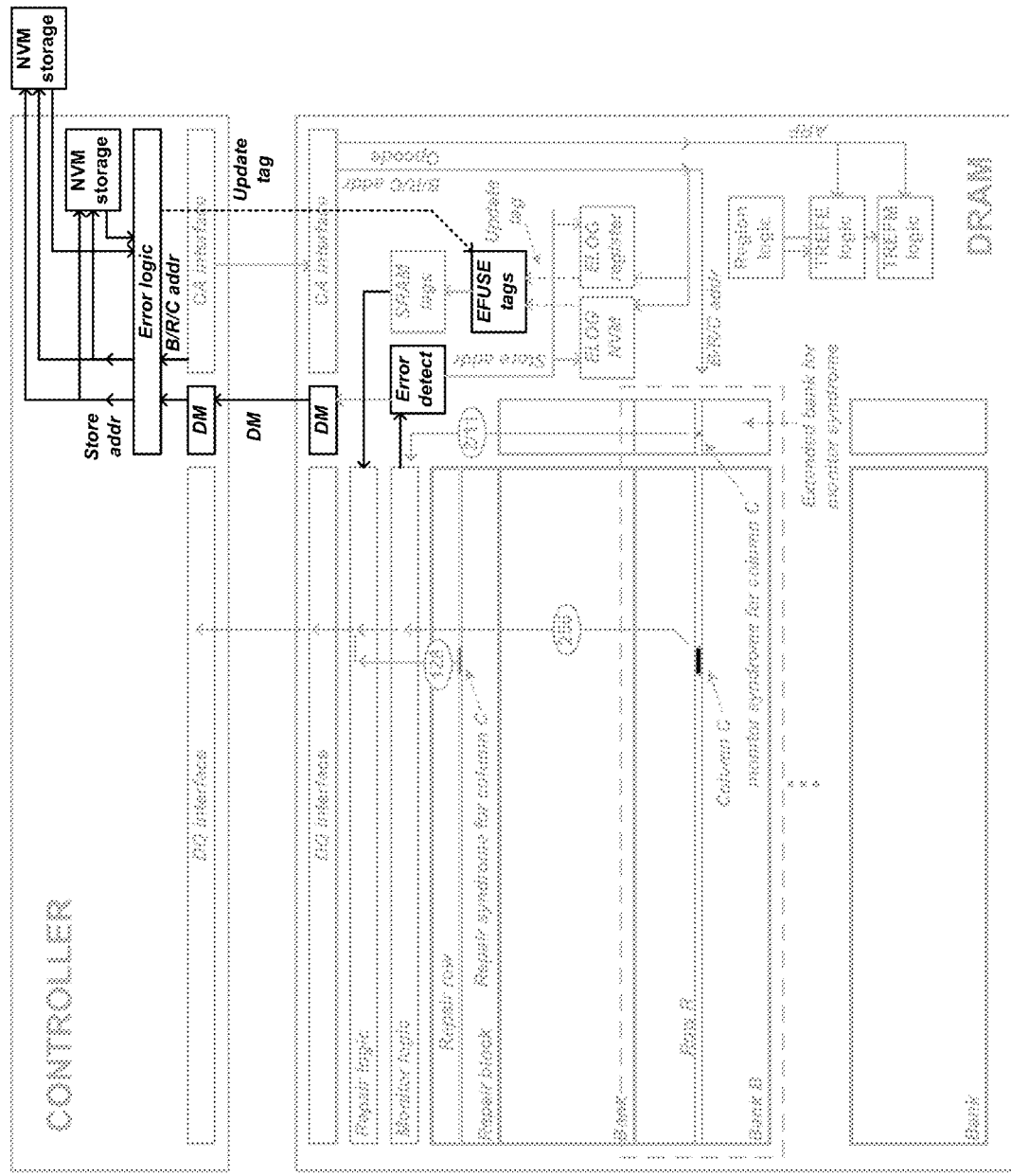
FIG. 3C illustrates the third of three methods of handling the case in which an error is detected (or corrected) after a read operation.

FIG. 3B shows the second of three methods of handling the case in which an error is detected (or corrected) after a read operation. For this second method, when an error is detected, the "Error detect" block causes the bank and row address (of the column with the error) to be loaded into the "ELOG NVM" block. This is a special non-volatile memory structure, separate from the EFUSE tag block, which is also non-volatile.

As in FIG. 3A, the rate of error events is expected to be very low, so a small number of ELOG NVM entries (possibly only one) should be adequate. Each entry would contain a modest number of bits, typically about 10-30. This is enough to hold the bank and row addresses (and possibly even the column address of the error block), plus a control field to indicate whether the entry holds a valid error tag.

This means that the circuit technology needed to implement the small number of storage bits for the ELOG NVM block could be relatively area inefficient compared to the EFUSE tag block (which would typically have hundreds or thousands of entries, each with 10-30 bits). Also, the ELOG NVM block only needs a modest retention time relative to the EFUSE tag block, since it simply needs to hold the error tag entry until the next power down or power up event. An NVM retention time of days would be adequate for the ELOG NVM block, compared to an NVM retention time of decades for the EFUSE tag block.

With a relaxation of the area and retention time characteristics, there is a wider range of technology choices for the ELOG NVM. It is assumed that it uses the standard CMOS devices available in the memory component. The ELOG NVM utilizes circuits that create higher supply voltages via charge pump techniques, and which perform carrier injection onto floating gates via avalanche or tunneling mechanisms to achieve non-volatile storage with modest retention times. Such non-volatile storage structures have been demonstrated in logic components built with typical CMOS processes, and would work with the CMOS devices available in a DRAM memory component.

In one embodiment, the ELOG NVM program/erase circuitry utilizes a time interval to be enabled and stabilized. In this case, the ELOG register of FIG. 3A would temporarily hold the entry for an error event, and this entry would be programmed into the ELOG NVM block at a later time. The ELOG register will need to be transferred to the non-volatile ELOG NVM structure before the next power-down event of the memory component. During this time interval (before the ELOG register to ELOG NVM transfer) subsequent memory accesses could continue to be performed so that the system performance is not impacted. It is expected that the rate of these error detection events will be very low, so a small number of ELOG register and ELOG NVM entries (possibly only one of each) should be adequate.

As in the ELOG register method of FIG. 3A, the ELOG NVM entry would include a field that has been previously initialized to a known value indicating no-error. After an error is detected, the field is changed to another value indicating error (along with the bank and row address fields). These no-error and error values should be chosen to be distinguishable from a value that could appear after a power-up event or a power-spike event. This field could include a parity check or other form of error correction/detection to ensure that the error entry does not itself contain an error.

Once the error entry has been stored in the ELOG NVM block, the memory component has a great deal of flexibility in terms of when the entry is transferred permanently to the EFUSE tag block. This transfer can happen immediately for the case in which the memory component is able to generate the needed EFUSE programming voltages internally and can carry out EFUSE programming while subsequent memory accesses are occurring. This case has been discussed in FIG. 3A. Since the ELOG NVM block has been included at some cost, it is likely that these two conditions are not satisfied.

A second possibility is to supply the voltage needed for an EFUSE program operation from an external source—the controller component, for example. This could be done immediately after the error event by signaling an error with the DM link (note this is not highlighted in this figure, but is shown in FIG. 3C). The generation of this external voltage and the EFUSE programming operation could occur while subsequent accesses are occurring, so that performance is not impacted. Again, since the ELOG NVM block has been included at some cost, it is also likely that these conditions are not satisfied.

Alternatively, when the DRAM enters a low power state, and power is removed from the DRAM, the PWDN sequence could be modified to generate the external voltage for a specific interval of time. This would give the memory component a window of time to perform the EFUSE transfer if an error event has been logged in the ELOG register. Again, since the ELOG NVM block has been included at some cost, it is also likely that these conditions are not satisfied.

A fourth possibility is that the ELOG NVM to EFUSE tag transfer occurs after the DRAM enters a low power state, and power is removed from the DRAM. This condition involves the use of an ELOG NVM structure so that the error event information is not lost when power is removed before the entry is transferred to the EFUSE tag. This allows the transfer to occur during the following PWUP power up sequence, when power is being restored to the DRAM.

The power up timing (and other) specifications will typically be different than the specifications for the power down timing. In particular, there will be more time spent with initialization requirements, providing more opportunities to perform the EFUSE tag programming operation in parallel. If the DRAM uses an external voltage to be supplied for EFUSE tag programming, the PWUP sequence could be modified to generate the external voltage for a specific interval of time.

When an error is detected and/or corrected, the controller operates consistent with what was outlined above in connection with Section [3.1] (i.e. notify controller via DM link, abort the application thread, correct error, repair column block, defer repair, etc.).

As in FIG. 3A, a particular storage location that generates an error that is detected will probably only do so once, and once repaired, will not repeat.

[3.3] Read Error—Store Address in CTRL NVM, Update Tag at PWDN or PWUP

FIG. 3C shows the third of three methods of handling the case in which an error is detected (or corrected) after a read operation. For this third method, when an error is detected, the "Error detect" block causes the bank and row address (of the column with the error) to be (temporarily) stored in an "NVM storage" that is located external to the DRAM memory component.

In the figure, the NVM storage structure is shown as either being a block inside the controller component, or being a component outside the controller component connected via a set of links that are different than the DQ, DM and CA links connecting the controller and memory controller. There are two other alternatives that are not explicitly shown, but which are functionally similar. There could be an external NVM storage component attached to the DQ, DM and CA links, and managed by the controller. There could be an external NVM storage component attached directly to the memory component with links that are different from the DQ, DM and CA links. The NVM storage component could be managed by either the DRAM component or managed by the controller in this last case.

As in FIG. 3A, the rate of error events is expected to be very low, so a small number of NVM storage entries (possibly only one) should be adequate. Each entry would contain a modest number of bits, typically about 10-30. This is enough to hold the bank and row addresses (and possibly even the column address of the error block), plus a control field to indicate whether the entry holds a valid error tag.

When an error is detected, the controller is notified. This may be done with the DM link—the DM control is not typically used during a read operation, and data slots are available. In the case of error detection (not correction) it is likely that the application thread that generated the memory read operation will have to be aborted. Alternatively, another link could be used to notify the controller (this alternative is not shown in FIG. 3C, but is functionally similar).

A notification is also sent to the controller so that the error event can be logged. The controller will have a copy of the bank, row and column address (that caused the error event) in the command queue in the CA interface. The appropriate address fields can be combined with the error event signal on the DM link to create an error entry. This error entry is stored in the NVM storage structure.

As in the ELOG register method of FIG. 3A, the NVM storage entry would include a field that has been previously initialized to a known value indicating no-error. After an error is detected, the field is changed to another value indicating error (along with the bank and row address fields). These no-error and error values should be chosen to be distinguishable from a value that could appear after a power-up event or a power-spike event. This field could include a parity check or other form or error correction/detection to ensure that the error entry does not itself contain an error.

Once the error entry has been stored in the NVM storage structure, the memory component has a great deal of flexibility in terms of when the entry is transferred permanently to the EFUSE tag block. This transfer will cause the error entry to be moved on the CA links to the EFUSE tag structure. Alternatively, the error entry could be moved on the DQ links, or on a set of links that are not part of the memory interface shown. An example for this last case could be an I2C or similar serial connection bus.

This transfer can happen immediately for the case in which the memory component is able to generate the needed EFUSE programming voltages internally and can carry out EFUSE programming while subsequent memory accesses are occurring. This case has been discussed in Section [3.1].

A second possibility is that the voltage needed for an EFUSE program operation is supplied from an external source—the controller component, for example. This could be done immediately after the error event by signaling an error with the DM. The generation of this external voltage and the EFUSE programming operation could occur while subsequent accesses are occurring, so that performance is not impacted.

Alternatively, when the DRAM enters a low power state, and power is removed from the DRAM, the PWDN sequence could be modified to generate the external voltage for a specific interval of time. This would give the memory component a window of time to perform the EFUSE transfer if an error event has been logged in the ELOG register.

A fourth possibility is that the NVM storage to EFUSE tag transfer occurs after the DRAM enters a low power state, and power is removed from the DRAM. This allows the transfer to occur during the following PWUP power up sequence, when power is being restored to the DRAM.

The power up timing (and other) specifications will typically be different than the specifications for the power down timing. In particular, there will be more time spent with initialization requirements, providing more opportunities to perform the EFUSE tag programming operation in parallel. If the DRAM requires an external voltage to be supplied for EFUSE tag programming, the PWUP sequence could be modified to generate the external voltage for a specific interval of time.

When an error is detected and/or corrected, the same alternatives described in connection with FIG. 3A will apply here as well (i.e. notify controller via DM link, abort the application thread, correct error, repair column block, defer repair, etc.).

As in FIG. 3A, a particular storage location that generates an error that is detected will probably only do so once, and once repaired, will not repeat.

[4] Subsequent Read Operation to Column C of Row R of Bank B w/Repair

Figure 4:
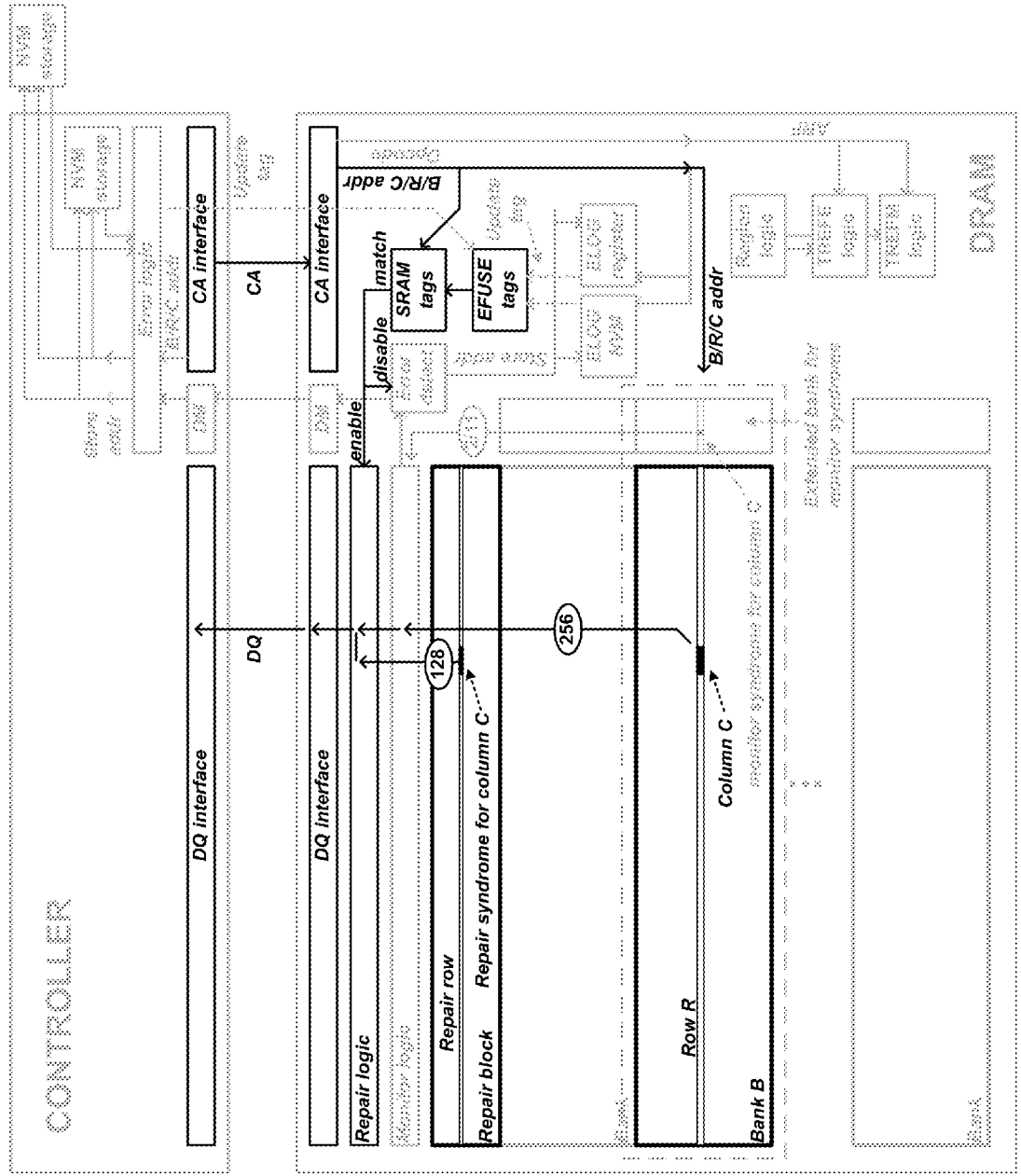
FIG. 4 illustrates the handling of a read operation which accesses a row which has previously had an error detection event.

FIG. 4 shows the handling of a read operation which accesses a row which has previously had an error detection event.

Sections [3.1], [3.2], and [3.3] described different methods of handling an error detection (or correction) event. All methods transfer the address of the error to an entry in the EFUSE tags. This transfer may take place immediately after the error occurs, it may be delayed until the next power-down sequence of the memory component, or it may be delayed until the next power-up sequence of the memory component. Alternatively, the transfer operation could be performed explicitly by the controller without requiring a power-down or power-up of the memory component.

When an error is detected, the application thread making the access will typically be terminated. If the access was made by the operating system, the system will probably need to restart. It is possible that the system will perform a restart (including either a memory power-down and power-up, or an explicit command to update the EFUSE tags) in order to ensure that the error address is transferred to the EFUSE tags so that subsequent accesses to the column are repaired.

When the DRAM component goes through a power up sequence, the error entries in the EFUSE tag structure will be transferred into the "SRAM tag" structure. This is carried out in some embodiments because the EFUSE tag structure is typically organized for serial access, while the SRAM tag structure may be accessed in parallel. A parallel access is needed for performance reasons.

Each address for a read or write operation is compared to the entries in the SRAM tag structure. A column access command typically includes an opcode (RD or WR), a bank address, and a column address. A row address is also provided for the comparison. This is supplied by a set of address registers which contain the row address that is currently open in each bank. There is one register per bank, plus a valid bit to indicate whether the bank is open. These address registers are not shown in FIG. 4.

These address registers are loaded when a bank is opened, and are invalidated when a bank is closed. Opening and closing a bank is also called activating (sensing) and precharging a bank. The activate (ACT) and precharge (PRE) commands that are issued by the controller cause this to happen.

When the bank and row (and, optionally, column) address of a read or write command match an entry in the SRAM tag structure, the repair block will also be accessed. Also, when the repair block is used, the Error detect structure (that is part of the monitoring method) will be ignored; the code used in the repair block will compensate for any errors that are detected/corrected by the monitoring method.

The repair block is organized as a set of independent banks that are accessed in parallel with the primary banks. Each repair bank contains only a fraction of the number of rows as the primary bank—typically $\frac{1}{32}^{nd}$ as many. In the example memory the primary bank has 32K rows and a repair bank has 1K rows.

Each repair row has as many column blocks as a primary row, 64 in this example memory. However, each column block in a repair row is half the size of the column block in a primary row, 128 bits and 256 bits, respectively.

When a row is repaired, the 128 bits from the repair column block are combined with the 256 bits from the primary column block. The additional bits are used as syndrome bits for a (12, 8) ECC code for each byte of the primary column block. This allows a single bit error to be corrected in each byte of the 16 byte column block.

This repair method also supports accesses at the byte level. When a write operation is performed using the DM links (data mask or byte enable control), individual bytes can be overwritten in a 16-byte column block. The syndrome for each byte will be written with the byte, so any errors will continue to be corrected.

A point to consider involves the organization alternatives for the SRAM tag structure. As noted above, an error event will produce a bank address, a row address and a column address. These address fields point to the location of the column block with a detected error. In the case of a single bit error with the 11 bit syndrome, the location of the error bit within the 256 bit column block can also be determined.

The 4Gb memory example has a 3-bit bank address field, a 15-bit row address field, a 6-bit column address field, and an 8-bit bit-address field. The repair method adds a 128-bit syndrome to each 256-bit column block of a row with a detected error; in other words, every one of the 2K bytes in a row (16 Kbits per row) is augmented with a 4-bit repair syndrome (8 kbits per row).

Consequently, only the bank address and row address of the error location are needed for this repair method. Other repair methods might repair individual column blocks or individual bits within a column instead of whole rows, and they would require more of the address fields of the error location to be stored in the tag structure.

The error event causes a bank address (3-bits) and a row address (15-bits) to be generated. However, the structure of the SRAM will affect the number of address bits which need to be stored. This example assumes that there are 1 k tag entries in both the EFUSE tag structure and the SRAM tag structure.

A fully associative tag structure can map any tag entry to any bank/row address. Thus, the tag will need the full 18-bits of the bank and row address fields. This is a flexible mapping method, but may require the most tag storage and the most complex comparison circuitry.

A single-set (also called direct-mapped) tag structure is divided up so that each tag entry can be mapped to one row in each set of 256 rows of a particular bank. Thus, 1K tag entries can repair the 256K rows within the eight banks. Each tag entry only needs to store the lower eight bits of the row address field; the bank address field and the upper seven bits of the row address field can be inferred from the address of each read or write operation that is performed.

This is a relatively low cost mapping method, since it stores the smallest number of bank and row address bits, and it only needs to perform a single 8-bit address tag compare during each read or write operation. However, this alternative is the least flexible mapping, since it can only repair one row in each set of 256 rows.

A multi-set tag structure provides a balance between cost and flexibility. In the case of a two-set tag structure, tag entries are paired up. Either entry of a pair can be mapped to one row in each set of 512 rows of a particular bank. Each tag entry only needs to store the lower nine bits of the row address field; the bank address field and the upper six bits of the row address field can be inferred from the address of each read or write operation that is performed.

This may be considered only slightly more costly than the single-set method, since it stores only one additional address bit, and it only needs to perform two 9-bit address tag compares during each read or write operation. The two-set alternative provides much better mapping flexibility than the single set method. The number of sets can be increased further so the mapping flexibility can approach that of the fully associative alternative.

All of these tag organization alternatives store an address value in each tag entry. There will also be an additional field with one or more bits of information. In this example, this field contains a valid bit, which indicates whether the tag entry is being used to repair a row, or is still being held in reserve.

The field could also contain one or more bits with some kind of error detection code to ensure that an entry is interpreted properly. An example of this might be a single parity bit. Other codes could be used, as well. This feature would guard against a tag entry being improperly initialized, or developing an error during operation.

[5] Region E and Region M Size Specified by Control Register

Figure 5A:
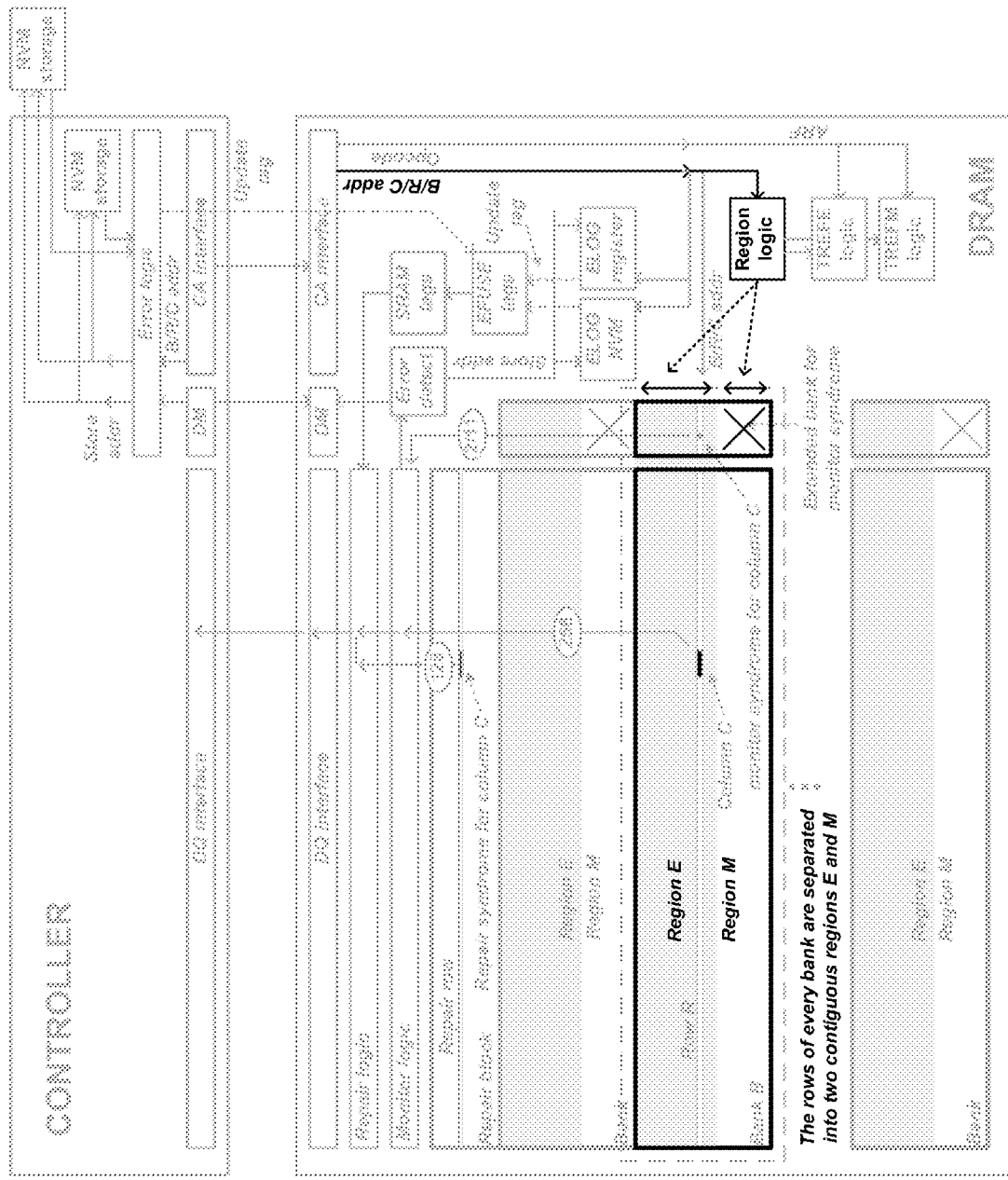
FIG. 5A illustrates the "Region logic" block dividing the address space of the DRAM memory component into two regions.

FIG. 5A shows the "Region logic" block dividing the address space of the DRAM memory component into two regions.

The address of each read or write operation is checked by the Region logic block. It contains one or more control registers containing address values which determine to which of the regions the read or write operation is directed. These regions are labeled "Region E" and "Region M".

In this example, the two regions are each formed from contiguous sets of rows in each bank. Other alternatives are possible. The regions could be formed from different (whole) banks or the regions could be formed from contiguous column blocks in the same row. It is even possible that the two regions are formed from non-contiguous column blocks or rows. And any of these alternatives could be combined.

The advantage of the region mapping shown in the figure is that an application that is using one region or the other will still be able to interleave read and write accesses across all the banks to maximize performance. Further, the Region logic block only needs to compare the (15-bit) row address of the read/write operation with the (15-bit) address value in the control register to determine which region is being used.

[5.1] Region M can Use DM Byte Mask Enable During Write Operations

Figure 5B:
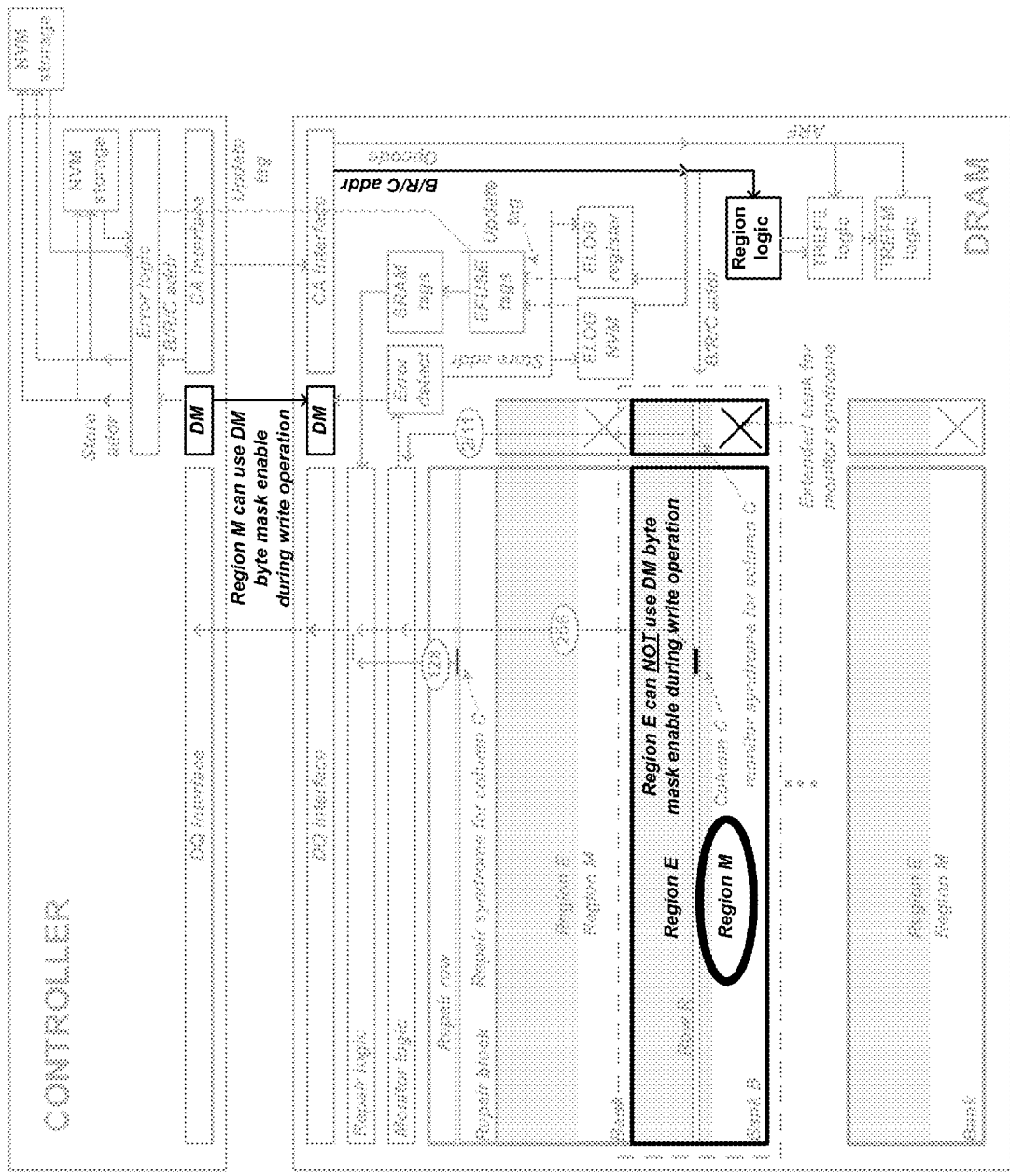
FIG. 5B illustrates the "Region logic" enabling Region M to perform masked write operations using the DM link to supply the enable control.

FIG. 5B shows the "Region logic" enabling Region M to perform masked write operations using the DM link to supply the enable control. If the address for a write operation lies in the Region M address space, the control information on the DM links will control how it is written to the column block on a byte by byte basis. If the SRAM tag indicates that this row has been repaired, then the associated column syndrome (a 4-bit group) will also be generated and written into the repair row for each byte that is written.

The Region logic block also disables Region E from performing masked write operations. If the address for a write operation lies in the Region E address space, the control information on the DM links will be ignored, and the entire column block (32 8-bit bytes) will be written. If the SRAM tag indicates that this row has been repaired, then the associated column syndrome (32 4-bit groups) will also be generated and written into the repair row.

[5.2] Region E Uses Extended Bank to Monitor Error Syndrome

Figure 5C:
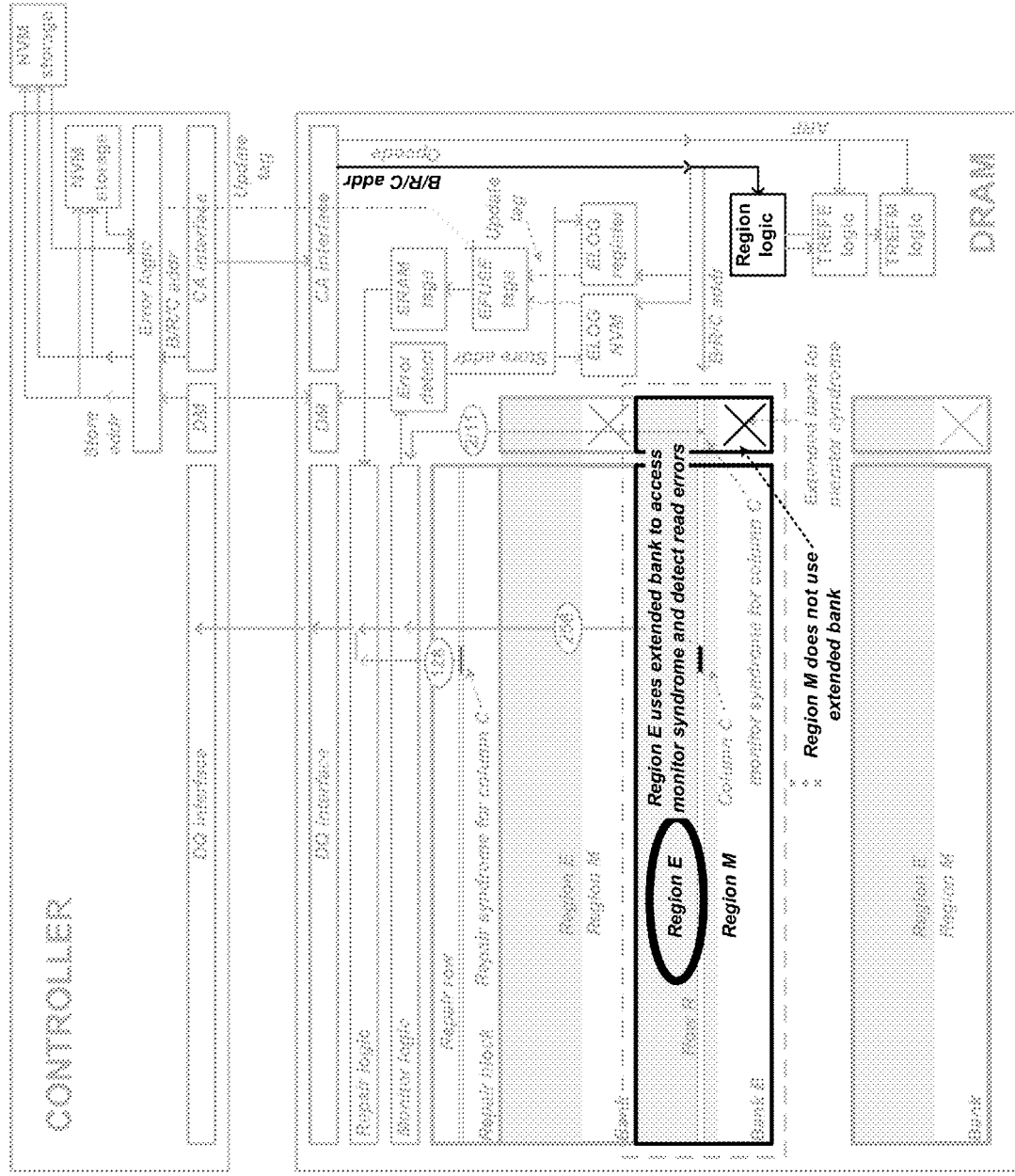
FIG. 5C illustrates the "Region logic" enabling Region E so that every write operation generates a syndrome for the extended bank, and every read operation uses this syndrome to detect (or correct) errors.

FIG. 5C shows the "Region logic" enabling Region E so that every write operation generates a syndrome for the extended bank, and every read operation uses this syndrome to detect (or correct) errors. This syndrome will be either 2-bits or 11-bits, as previously described.

The 2-bit syndrome includes a parity bit for detecting a one bit error in the 256-bit column block. It will also include an enable bit, to indicate the syndrome is valid.

The 11-bit syndrome includes a 9-bit Hamming encode field for correcting a one bit error in the 256-bit column block. The 11-bit syndrome also includes a parity bit for detecting a two bit error in the 256-bit column block. And it will also include an enable bit, to indicate the syndrome is valid.

Both of these syndromes are generated and checked using the entire 256-bit column block, so it is not possible to directly perform writes of individual 8-bit bytes with the DM (data-mask) links.

The Region logic block also disables Region M from generating and checking a syndrome for the extended bank. This allows Region M to perform write operations using byte enable control with the DM links without disrupting a syndrome for the 256-bit column block and creating a false error detection event.

As mentioned earlier, there is an alternate way to use the byte enable control with write operations. When a write operation with individual byte enable control is made to a 256-bit column block, the enable bit of the 2-bit or 11-bit syndrome is automatically cleared. This will prevent a false error detection event, and it can be done at the granularity of column blocks.

There is a third way to use the byte enable control with write operations. When a write operation with individual byte enable control is made to a 256-bit column block, the column block is first read by the controller, the appropriate bytes are modified to their new values, and the column block is written back to the location. The 2-bit or 11-bit syndrome will be checked by the read operation, and a new syndrome will be generated by the write operation do that error detection (or correction) will be preserved. The disadvantage of this approach is the performance cost of performing the initial read operation for the composite read-modify-write.

[5.3] Region E has Longer Auto-Refresh Interval (Set by Control Register)

Figure 5D:
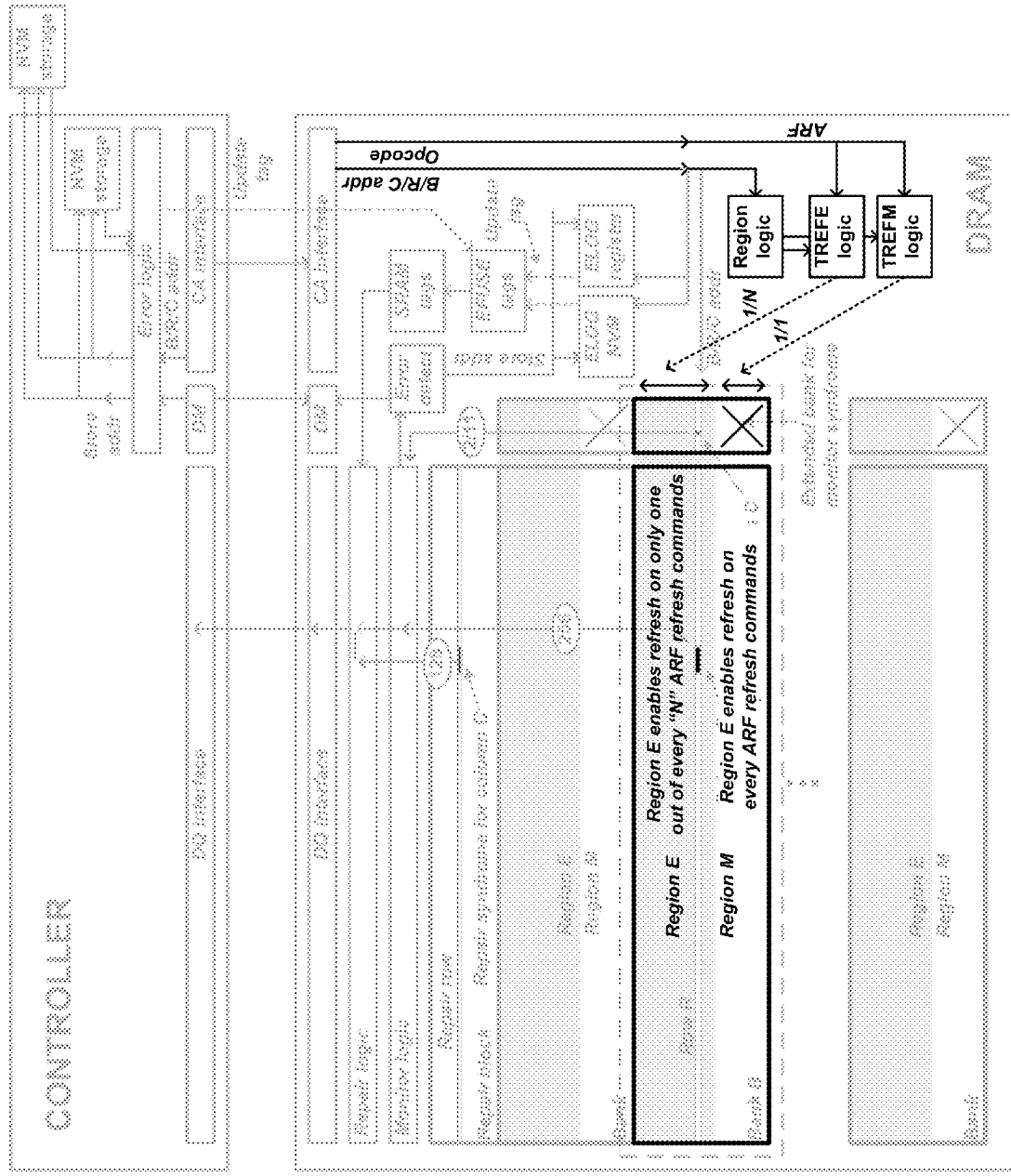
FIG. 5D illustrates the "Region logic" adjusting the interpretation of an "ARF" (auto-refresh) command received from the controller via the CA links.

FIG. 5D shows the "Region logic" adjusting the interpretation of an "ARF" (auto-refresh) command received from the controller via the CA links.

Normally each ARF command will cause one row of each bank to be refreshed. The row address to be refreshed is determined by a value in a control register, and is incremented after the refresh completes.

All banks will be precharged by the controller prior to the ARF command. A refresh operation involves activating a bank (same as the ACT command used before read and write commands), and then precharging it (same as the PRE command used after read and write commands).

The ARF command typically causes all banks to simultaneously activate, and then simultaneously precharge. Some DRAM components may perform a staggered activate and a staggered precharge, in order to minimize the peak supply current required by the component. ARF commands will be issued by the controller at a high enough rate to ensure that every row is refreshed in each tREF interval. With 32K rows per bank, and a tREF of 64 ms, an ACT command would be issued approximately every 2 μs.

The Region logic, TREFE logic, and TREFM logic shown in FIG. 5D keeps track of the row to be refreshed. Rows that are in region M are refreshed each time an ARF command is received from the controller.

On the other hand, rows that are in region E are refreshed only after "N" ARF commands have been received from the controller. This can be controlled with a single control register with N or more states.

This N control register is incremented after the control register for the refresh row reaches its maximum value and wraps back to zero. The rows in region E are refreshed by ARF commands during the interval that the N control register is equal to (N−1), and the ARF commands are ignored during the interval that the N control register is equal to (0) through (N−2).

The result of this refresh method is that the DRAM storage cells in region M are refreshed at the nominal interval of tREF, and the DRAM storage cells in region E are refreshed at the increased interval of (N*tREF).

Storage cells that are refreshed at an increased interval are more likely to suffer retention errors. Region E (with the increased refresh interval) also utilizes the error detection (or correction) method in the extended bank and monitor logic blocks. Cells with retention errors can then be repaired with the SRAM tag and repair logic blocks.

Storage cells that are refreshed at the nominal interval are less likely to suffer retention errors. Consequently, it is less important for region M to utilize the error detection (or correction) method. This also means that region M can support byte write operations because it does not need to maintain a syndrome covering the 256-bit column blocks.

[5.4] Region E has Longer Self-Refresh Interval (Set by Control Register)

Figure 5E:
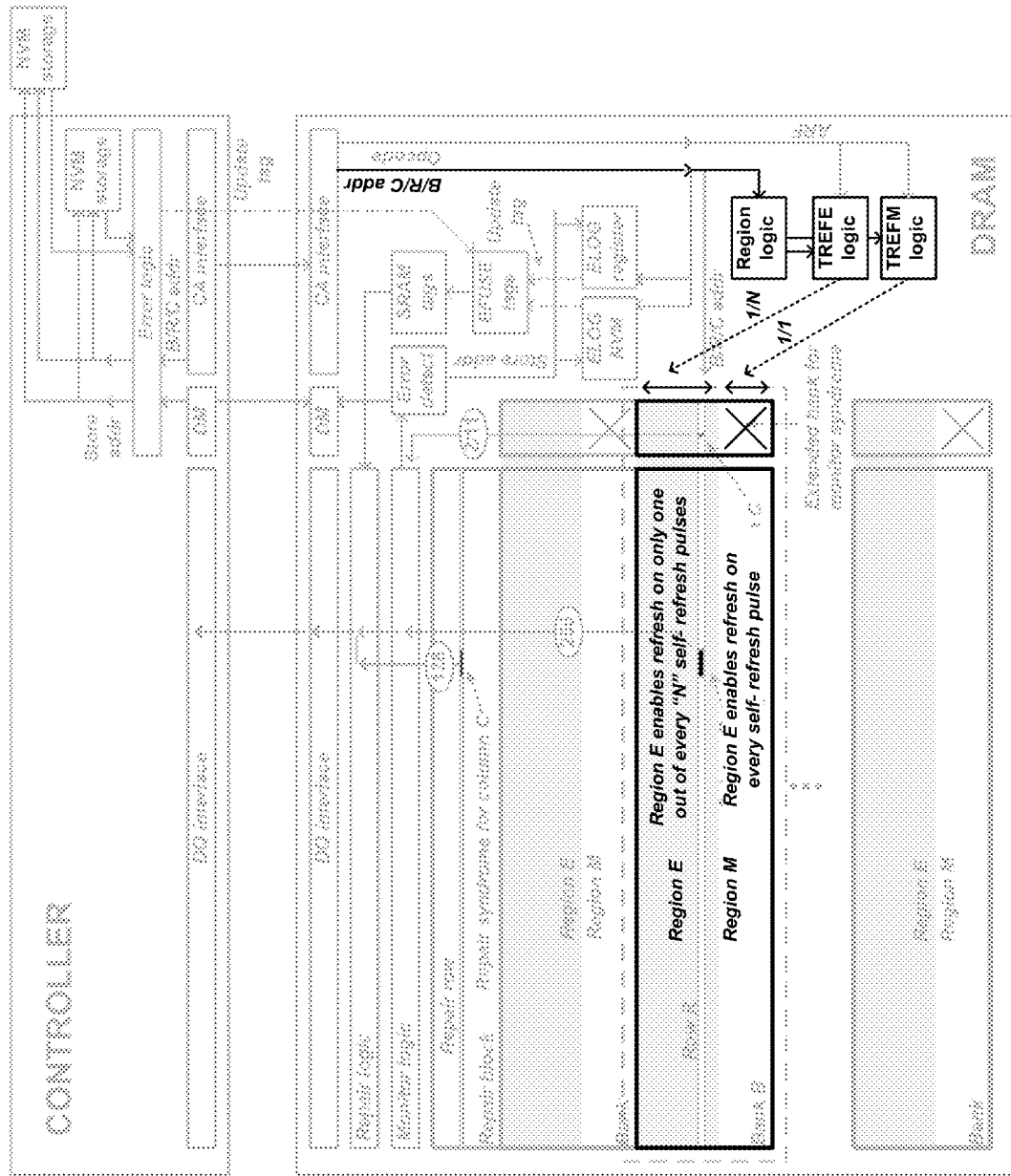
FIG. 5E illustrates the "Region logic" adjusting the refresh interval that is generated by the internal refresh timer.

FIG. 5E shows the "Region logic" adjusting the refresh interval that is generated by the internal refresh timer.

"Self-refresh" is a mode of refresh operation that is enabled when the DRAM enters a low power state. In this state, the DRAM will not interpret commands (except for the exit command) and transmit or receive data. It will use an internal timer to generate refresh timing events to retain the contents of the storage cells. This timer will self-adjust for supply voltage and temperature variations so the self-refresh timing intervals are as long as possible without compromising the data in the storage cells. The DRAM exits this low power state when one of the links of the CA interface transitions (the exit command, mentioned above). After an appropriate exit interval is observed, the controller may begin sending commands to the DRAM.

During self-refresh, each refresh event (a pulse from the refresh timer) will cause one row of each bank to be refreshed. The row address to be refreshed is determined by a value in a control register, and is incremented after all banks have been refreshed for that row value. All banks will be precharged by the controller prior to entering the low power state. A refresh operation involves activating a bank (same as the ACT command used before read and write commands), and then precharging it (same as the PRE command used after read and write commands).

The refresh event can cause all banks to simultaneously activate, and then simultaneously precharge. Alternatively, some DRAM components may perform a staggered activate and a staggered precharge or all banks, in order to minimize the peak supply current required by the component.

A third alternative is that each refresh event causes one row of one bank to refresh. This will involve a number of banks NBANK more refresh events per tREF interval than the first two methods (NROW*NBANK versus NROW, respectively. Here NBANK is the number of banks (8) and NROW is the number of rows (32K). This will not affect the refresh power, but will perhaps simplify the self-refresh control logic.

This last alternative will also keep track of the self-refresh bank address (a three bit control register) and will generally ensure that at the self-refresh to auto-refresh transition that no rows are skipped. This typically is carried out by refreshing all banks at the current row address at the self-refresh exit before incrementing the row value.

Self-refresh events will be issued by the TREF logic at a high enough rate to ensure that every row is refreshed in each tREF interval. With 32K rows per bank, and a tREF of 64 ms, a self-refresh event would be issued approximately every 2 µs. If the third alternative is employed, these events would occur eight times more frequently.

The Region logic, TREFE logic, and TREFM logic shown in FIG. 5E keeps track of the row (and bank, for the third alternative) to be refreshed. Rows that are in region M are refreshed each time a self-refresh event is issued by the logic.

On the other hand, rows that are in region E are refreshed only after "N" self-refresh events are issued by the logic. This can be controlled with a single control register with N or more states.

This N control register is incremented after the control register for the refresh row reaches its maximum value and wraps back to zero. The rows in region E are refreshed by self-refresh events during the interval that the N control register is equal to (N−1), and the self-refresh events are ignored during the interval that the N control register is equal to (0) through (N−2).

The result of this self-refresh method is that the DRAM storage cells in region M are refreshed at the nominal interval of tREF, and the DRAM storage cells in region E are refreshed at the increased interval of (N*tREF).

Storage cells that are refreshed at an increased interval are more likely to suffer retention errors. Region E (with the increased refresh interval) also utilizes the error detection (or correction) method in the extended bank and monitor logic blocks. Cells with retention errors can then be repaired with the SRAM tag and repair logic blocks.

Storage cells that are refreshed at the nominal interval are less likely to suffer retention errors. Consequently, it is less important for region M to utilize the error detection (or correction) method. This also means that region M can support byte write operations because it does not need to maintain a syndrome covering the 256-bit column blocks.

In another embodiment, an increased self-refresh interval is applied to the M region as well as the E region. This can be done because there will be no masked write operations directed to the column blocks in the M region during self-refresh (the interface is not receiving normal commands, only the special self-refresh exit command). In this embodiment, the self-refresh power will be lowered. The cost is that the DRAM control logic must go through a special sequence when self-refresh is entered.

This sequence includes the following steps:

[1] Self-refresh operation begins, with the M region self-refreshing at the nominal tREF interval and the E region self-refreshing at the increased N*tREF interval.

[2] At some point, internal logic begins reading and writing every column of every row of every bank in the M region. The purpose of the reading and writing is to generate the 2-bit or 11-bit syndrome for each column block. This could be done immediately at the start of self-refresh, or could be done as part of each self-refresh activate/precharge, or it could be done as a set of operations that are carried out in parallel with the self-refresh operations.

[3] In the example DRAM, there are 256K rows in the 8 banks, each with 64 column blocks. It would require approximately 30 ns to perform each column read, column syndrome generation, and column write. If the M region is half the DRAM, then it will take approximately ¼ seconds to generate all the syndrome information. If one column syndrome is generated during each self-refresh event (nominally 2 µs intervals), then it will take approximately 16 seconds to generate all the syndrome information.

[4] After all the column syndromes have been generated and stored in the extended banks of the region M, the self-refresh rate of region M can be increased to N*tREF, the same as region E.

[5] When the DRAM receives a self-refresh exit command from the controller. It will revert to the auto-refresh mode described in [5.5]. The syndrome that was generated in the extended banks for region M will be ignored, region N will perform auto-refresh at the nominal rate of tREF, and region M will support masked write operations. The column syndromes that were generated for self-refresh in region M will be discarded.

It should be clear that the above sequence will not impact the entry or exit latency for self-refresh. When entering self-refresh, there will be some period of time (¼ second to 16 seconds) during which region M consumes a higher level of self-refresh power, but the DRAM will not require any additional time to exit normal operation and enter self-refresh; the transition to the longer self-refresh interval for region M is managed by the internal DRAM logic.

When the controller sends the self-refresh exit command, the DRAM will not require any additional time to transition to normal operation with a nominal auto-refresh interval for region M. This is because the column syndrome information that was generated for self-refresh error detection can be simply discarded. It is also possible to add a mode of operation in which each column syndrome is checked for errors the first time it is accessed after self-refresh exit. This can be done easily by using checking the enable bit of the syndrome to see if the syndrome is valid. After this first access with an error check, the enable bit will be cleared, indicating the syndrome is invalid.

When an error is detected in region E (or in region M, if the above sequence is performed) by the monitor logic during self-refresh, then the monitor logic will log the address of the error using one of the three methods previously discussed (Sections 3.1, 3.2, and 3.3). It is likely that this will be a two-step process, with the error address stored in the ELOG register structure, and then transferred to the EFUSE tag structure after the controller issues the self-refresh exit command and normal operation is restarted.

[6.0] Detail for DRAM Example

Figure 6A:
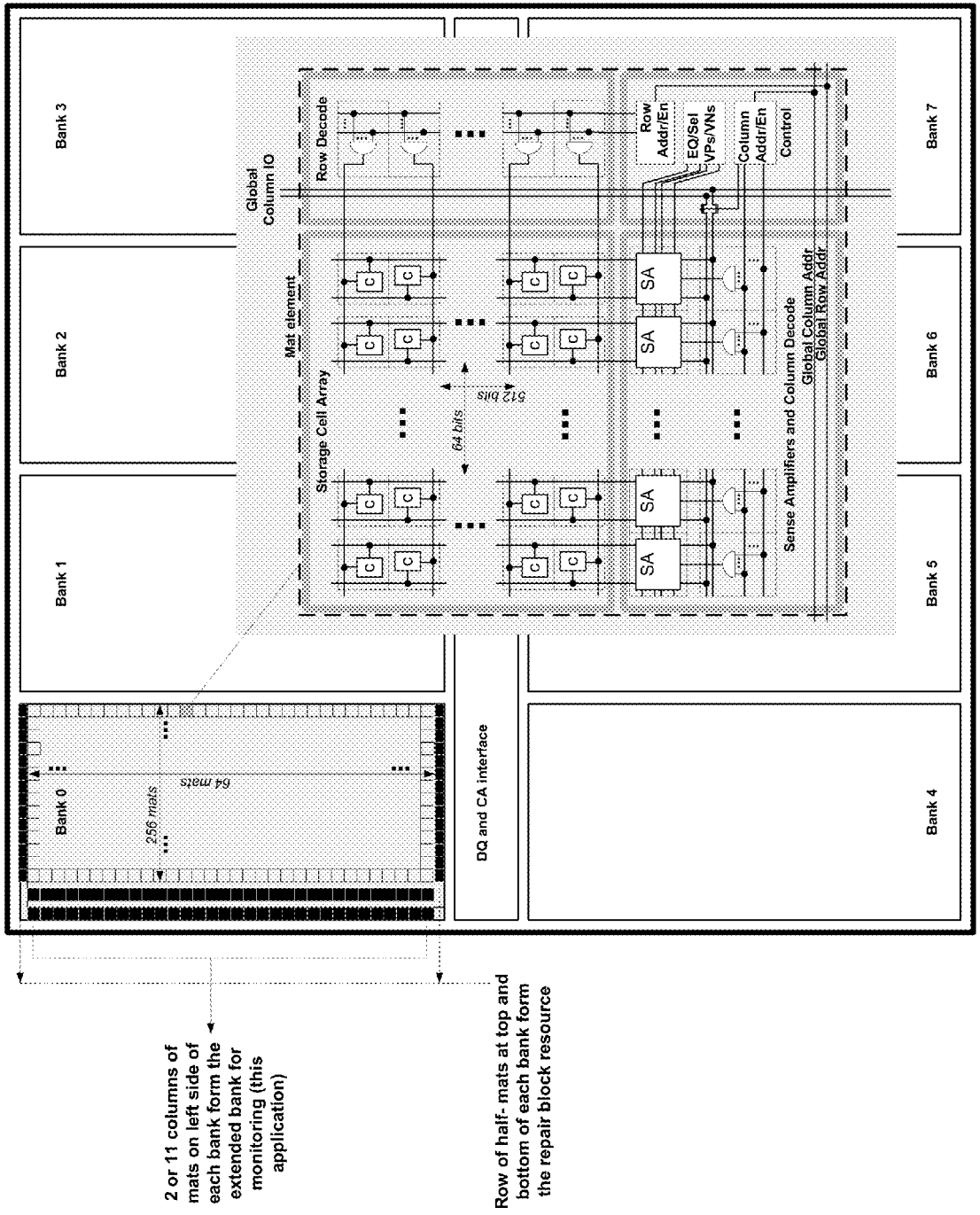
FIG. 6A illustrates one embodiment of the internal structure of a DRAM.

FIG. 6A shows one embodiment of the internal structure of the DRAM example. It consists of eight independent banks surrounding a central region with the interface for the DQ, DM, and CA links.

Each bank is composed of an array of 256×64 mat blocks or elements. Each mat includes an array of 64×512 storage cells, plus a row decoder, a column decoder, and a sense amplifier. Each bank has 65×512 rows.

There are global row and global column address signals which are routed to all the mat cells in a block. There are also enable signals which are used to select the set of mats which are accessed.

An activate command causes one row of 64 storage cells in each of a row of 256 mat blocks to be sensed and latched by the sense amplifiers of the mats. A column read or column write command will then access one of the 64 sense amplifier bits in each of the 256 mats. The 256 sense amplifiers are coupled to the DQ interface with the global column IO wires.

There is a row of 256 half-mat blocks along the top and bottom of each bank. These are employed to balance the bit line loading of the sense amplifiers in the adjacent rows of full mat blocks. Typically, the half-mat blocks are not used for storing data, but the suitable repair method noted above may utilize these storage cells for row repair. These two rows of half-mat blocks in the 8 banks form the repair block in FIG. 1 and similar figures. The column block in the repair row is connected to the interface block with a set of dedicated 128 column IO wires per bank. This allows the 32 4-bit repair syndromes to correct the 32 8-bit bytes being accessed as a column block. A (12, 8) correction code is used on each byte-syndrome pair.

Other repair methods are possible, as mentioned earlier. It is also possible that a row could be repaired by swapping in one of the spare rows that are available in each mat block. This repair method is normally used during the testing that is performed at the time the memory component is manufactured, but could also be used in connection with the error monitoring method described in this application.

There are an additional 2 columns or 11 columns of 64 mat blocks on the left side of each bank. This forms the extended portion of each bank, holding the syndrome used for error monitoring. Each of the extended mats is accessed in parallel with the row of 256 mats in the main part of the bank. This yields an additional 2 or 11 bits of information that is read and written with the same timing as the 256 bits from the main part of the bank.

[6.1] Mat Detail for DRAM Example

Figure 6B:
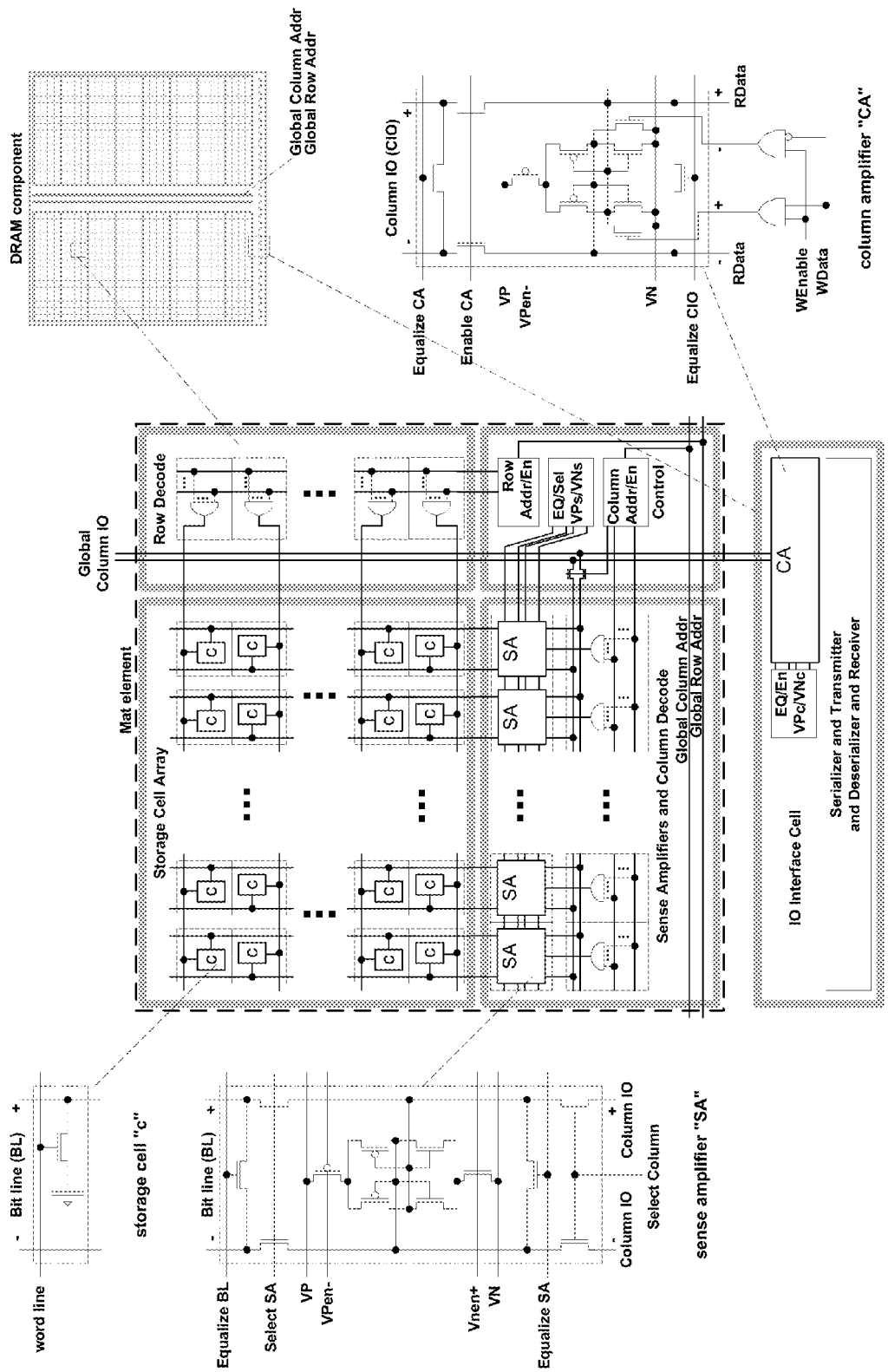
FIG. 6B illustrates one embodiment of the internal structure of a mat block included in the DRAM of FIG. 6A.

FIG. 6B shows the internal structure of a mat block or element. Each mat is composed of a 64×512 array of storage cells. There is a 512-to-1 decoder on the right side which asserts one word line, causing one of the rows of 64 storage cells to be sensed and held by the 64 sense amplifiers along the bottom of the mat. There is a 64-to-1 decoder on the bottom which couples one of the 64 sense amplifiers to the global column IO wire, allowing that sense amplifier to be accessed. This represents one bit of the 256-bit column block which connects to the interface block.

[6.2] Detail of Read Operation with 11-Bit Syndrome from Extended Bank

FIG. 6C shows the monitor logic detail. The monitor logic couples the global column IO wires to the DQ interface. This includes the 256 wires from the main bank, as well as the 2 syndrome wires or 11 syndrome wires from the extended bank. The figure shows the 11 syndrome wire case.

The 256 bits on the main column IO wires are encoded by the "256-to-1/9 encoder". The encoding process consists of exclusive-oring different sets of the 256 read data bits onto the nine read-correction syndrome wires and onto the one read-detection syndrome wire.

These nine read-correction syndromes are xored with the nine bit syndrome TAG[8:0] that is stored in extended bank. The nine-bit result will point to a single bit error. If the stored enable bit TAG[10] is set, then the syndrome is valid, and the indicated COLIO bit is inverted before transferring to the DQ interface.

These one read-detection syndrome is xored with the one bit syndrome TAG[9] that is stored in the extended bank. The one-bit result will indicate a double bit error, if the stored enable bit TAG[10] is set indicating the syndrome is valid.

The 2-bit syndrome case will be similar to 11 bit case, but with just the TAG[10] and TAG[9] bits stored in the extended bank.

[6.3] Timing Example—Interleaved Transactions with Auto-Refresh

Figure 7A:
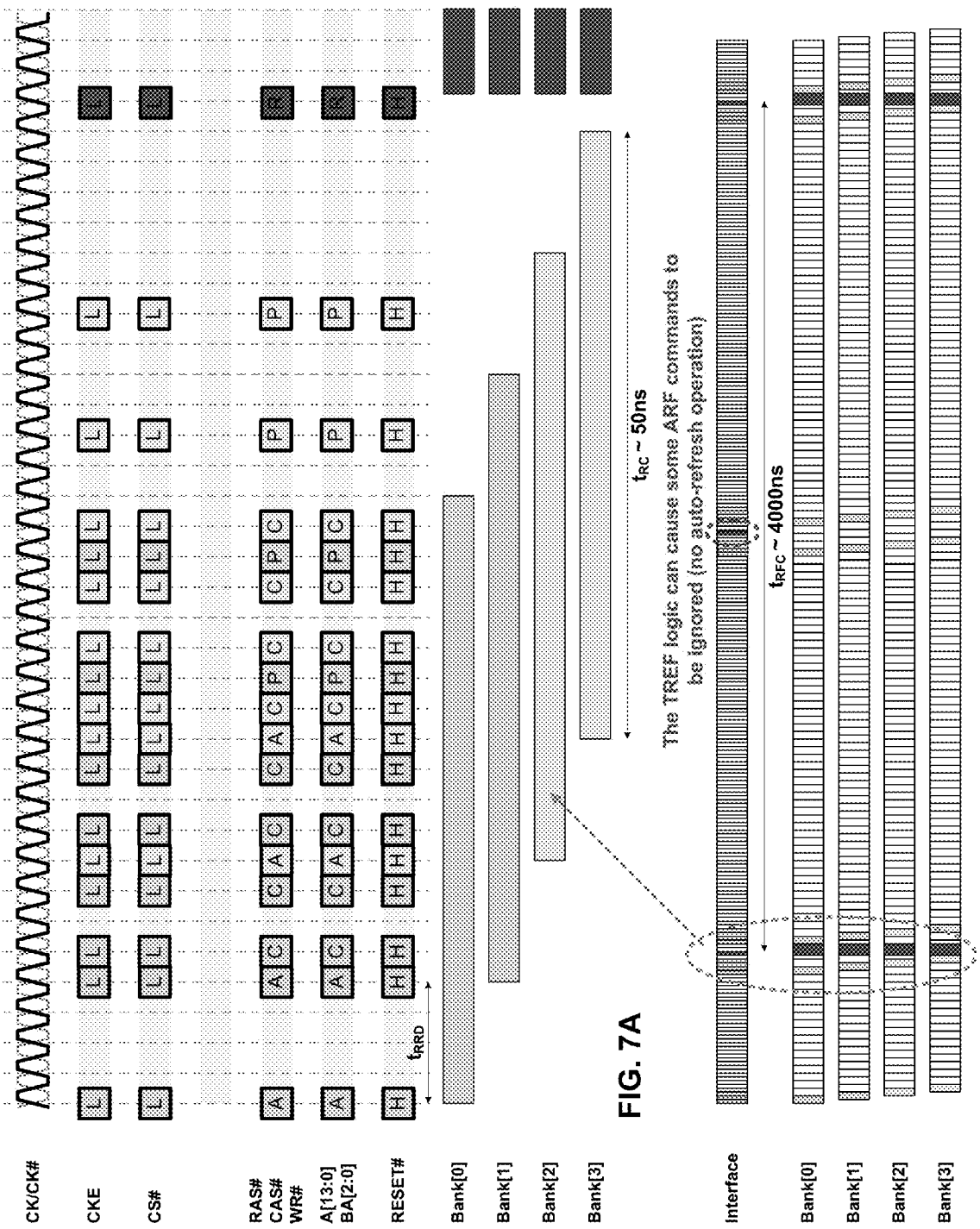
FIG. 7A illustrates an example of an auto-refresh command (ARF) received by the DRAM.

FIG. 7A shows an example of an auto-refresh command (ARF) received by the DRAM. In this example, the DRAM has received a series of four interleaved transactions to banks [0] through [3]. Each transaction consists of an activate command [A], two column commands [C], and a precharge command [P]. There are waveforms for the various CA links (CKE, CS, RAS, CAS, WR, A[13:0] and B2:0]). There are also four waveforms showing when each bank is performing row and column operations.

After bank [3] has completed the final precharge the ARF command [R] can be issued. This performs a simultaneous activate and precharge of one row in each of the banks. The row is specified by a value in a control register in the DRAM.

The final set of waveforms show the auto-refresh operations with a coarser time scale. After each auto-refresh is performed, interleaved transactions can be received by the DRAM once again. These waveforms also include the case in which the TREF logic has been set to skip some of the ARF commands; this example shows the TREF logic skipping one ARF command, so that there is effectively a 4000 ns interval between two auto-refresh operations. The interval can be adjusted to be other sizes, as described in section [5.3]. And the region division of the bank, row and column locations between the two regions can be adjusted, as described in section [5].

[6.4] Timing Example—Self-Refresh Example

FIG. 7B shows an example of the DRAM transitioning between normal operation and self-refresh operation.

The DRAM enters self-refresh operation when a command is received with the CA interface. Previously, all the banks have been placed into a precharged (closed) state. An internal oscillator OSC generates timing events (pulses) which cause all the banks to perform a simultaneous activate and precharge of one row in each of the banks. The row is specified by a value in a control register in the DRAM.

These waveforms also include the case in which the TREF logic has been set to skip some of the oscillator timing events; this example shows the TREF logic skipping two OSC pulses, so that there is effectively a 4000 ns interval between two self-refresh operations. The interval can be adjusted to be other sizes, as described in section [5.4]. And the region division of the bank, row and column locations between the two regions can be adjusted, as described in section [5].

[7] Overview of Controller/System Methods

For implementing a Dynamic Error Correction capability in a memory system, methods to communicate the internal status of the DRAM to the controller component are described below with reference to FIG. 1 and FIG. 8.

[7.1] Controller Polls DRAM Internal ECC and Repair Status

In the case where there are no dedicated pins for the DRAM to signal the controller independently, to inform of an ECC correction or internal repair event, the controller would operate to periodically poll the DRAM, analogous to the standard periodic polling by a controller of the DRAM temperature register.

For example, the controller would initiate a mode register write (MRW) to the Test Mode register, for which the commands are manufacturer specific. Alternatively, a register/command sequence could be employed.

Upon polling of the DRAM, if the ELOG register fields show an ECC correction has occurred, the address and other relevant contents of the ELOG register are then transferred from the DRAM to the controller, over the data bus by subsequent read operation(s), enabled by the test mode. If no ECC event has occurred, the ELOG register reads out a code to inform the controller such. The controller then transfers the ELOG register information either to on-board NVM or system level NVM for hand off to the system policy control. For example, a system policy would be to monitor the ECC corrections in the ELOG register, and then affect EFUSE repair on the DRAM after a certain ECC activity number/rate threshold is met. The policy can also include export of the ECC statistics to a file, a screen or to an external server.

DRAM Repair

If the controller provides the programming voltages and commands for the DRAM EFUSE programming, the controller initiates the programming sequence, which may occur independently of normal array accesses.

In the case which the DRAM has the internal voltages and capabilities to effect a transfer of the volatile ELOG register entry to program the non-volatile EFUSE elements, the controller will check the appropriate status fields of the ELOG register to verify EFUSE programming is either in progress or was successfully completed.

Update EFUSE Tag at PWDN—Volatile ELOG Register

For a volatile ELOG register, the transfer of the ELOG bits to non-volatile EFUSE should be complete before the DRAM can power down. While the EFUSE programming is still in progress, the controller would send an interrupt flag to the Power Management IC (PMIC) to delay any potential system power down. The controller would continue polling the ELOG status bits until the DRAM's EFUSE programming completes, then release the PMIC. Alternatively, the controller could write the ELOG information in parallel to internal nonvolatile memory (NVM), and then release the PMIC based on whether the DRAM or controller completed first.

Update EFUSE Tag at PWUP—Non-Volatile ELOG Register

The Non-volatile ELOG bits are designed as temporary NV storage to retain state for days or months. Therefore it is expected that ELOG NVM bits would require less resources/voltage/time to program than the EFUSE. As such, the ELOG NVM bits could commence programming upon detecting the ECC activation for a failing address, and program more quickly than EFUSE.

NOTE: the writing of the ELOG NVM bits should be complete before the DRAM can power down. Therefore the controller would delay any power down while polling the ELOG NVM status bits, until the programming completes, before releasing the PMIC.

Programming of the EFUSEs from the ELOG NVM register could then occur during a subsequent power up (PWUP). After voltages have stabilized during the initialization process, the contents of the ELOG NVM register would be transferred to and programmed into the EFUSEs. During this time the controller could periodically assert mode register read (MRR) commands or utilize an MRW to the test mode register, to enable monitor of the EFUSE programming until verified complete.

[7.2] Controller/DRAM Handshaking Internal ECC and Repair Status

In an alternative case, the DRAM can independently inform the controller of an ECC correction or internal repair event. In this case the DRAM provides a "handshaking" signal to the controller, which is activated internally from the ECC and repair status.

Figure 8:
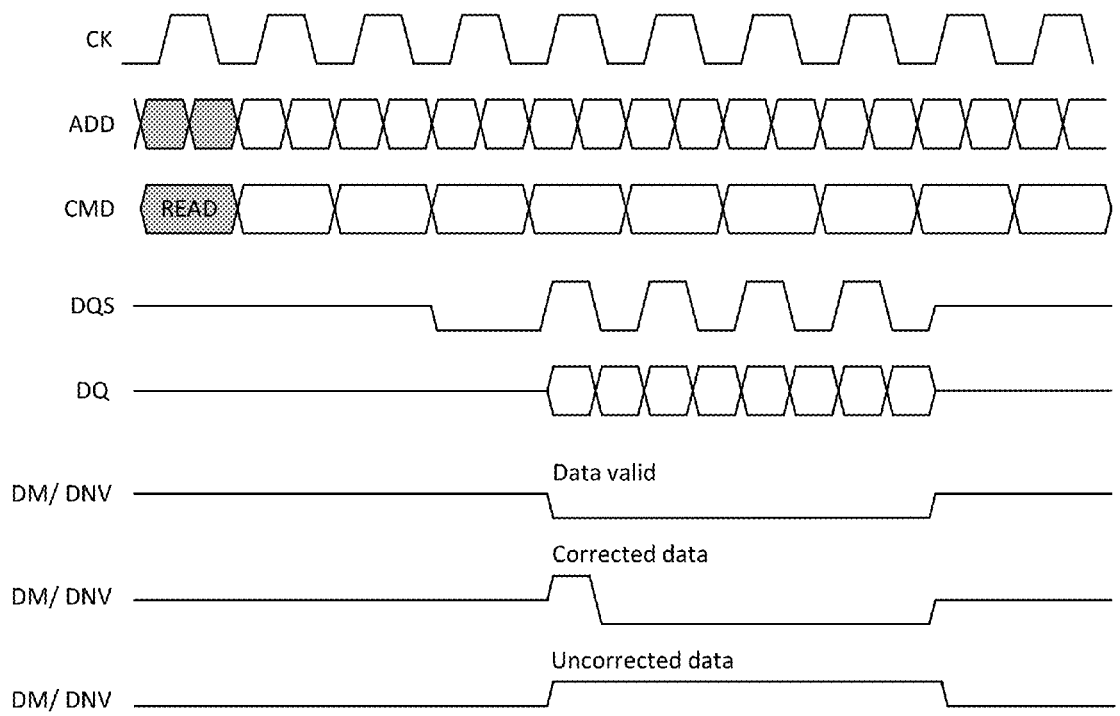

For example, the DRAM could incorporate the extended bi-directional Data Mask (DM) functionality as shown in the timing diagram of FIG. 8. One such functionality utilizes the DM selectively to mask input data during a Write to the DRAM. During a Read, the DM outputs a code to the controller to inform of valid or invalid data (DNV). A controller could verify this functionality during system power up/initialization by a standard MRR of the manufacturer ID and Revision ID registers. Alternatively, the functionality can be activated by a standard mode register write (MRW) to a configuration register.

Once the function is activated in the system, in the case of a DRAM read with no ECC correction, the DM/DNV output would be driven to a fixed state at the start of and for the duration of the data burst. In the case of the DRAM ECC activated to successfully correct and erroneous internal data bit, the DM/DNV will output a representative code during the data burst.

In the case of a read with an uncorrectable error encountered by the ECC logic, a different and unique code would be output on DM/DNV to the controller. An example would be the opposite fixed state as the no ECC correction described above. An uncorrectable error would likely result in the system stopping all processes and activation of a data recovery policy. This can be of critical importance as more mobile and wired systems are interconnected.

With the DM/DNV handshaking signal, the controller can now be informed for each read access of the ECC correction status. This functionality allows the controller flexibility to program the address in a local controller NVM block or pass it to system level NVM. It is expected that ECC corrected data accesses would evolve slowly over time. This would enable a repair policy in which after receiving a Read with DNV signal, the controller can poll the Operating System for low traffic periods in which to transfer the stored fault address to the DRAM for programming the EFUSE for repair. Alternatively, the controller policy could assert an interrupt, delaying DRAM traffic, to provide cycles for the address transfer to the DRAM. This would be analogous to present Refresh and impedance calibration operations in DRAM systems.

What is claimed is:

1. A method of operation in an integrated circuit (IC) memory device, the method to monitor the validity of error information associated with first data, the method comprising:

storing the first data in a first group of storage locations in the memory device;

storing the error information associated with the stored data in a second group of storage locations in the memory device;

evaluating the validity of the error information based on a state of an error enable bit, the state based on whether a most recent access to the first group of storage locations involved a partial access;

identifying a faulty storage location based on the error information;

storing an address corresponding to the faulty storage location; and repairing the faulty storage location for subsequent accesses by augmenting data stored in the faulty storage location with error correction bits from a repair group of storage cells.

2. The method according to claim 1 wherein a partial-write access to the first group of storage locations sets the state of the error enable bit such that the error information is invalid.

3. The method according to claim 1 wherein the error information comprises an error detection code.

4. The method according to claim 1 wherein the error information comprises an error correction code.

5. The method according to claim 1 wherein the error information includes the error enable bit.

6. The method according to claim 1 wherein the first group of storage locations comprises an addressable column of storage cells, and the partial access comprises a masked-write operation to less than all of the first group of storage locations.

7. The method according to claim 1 wherein storing the error information comprises:
   generating an error syndrome using the data in the first group of storage locations; and
   loading the error syndrome as the error information into an extended area of storage locations in the memory device that correspond to the first group of storage locations.

8. An integrated circuit (IC) memory device comprising:
   a first group of storage locations in the memory device to store data;
   a second group of storage locations in the memory device to store error information associated with the stored data;
   logic to evaluate the validity of the error information based on a state of an error enable bit, the state based on whether a most recent access to the first group of storage locations involved a partial access; and
   repair logic to
      identify a faulty storage location based on the error information,
      store an address corresponding to the faulty storage location, and
      repair the faulty storage location for subsequent accesses by augmenting data stored in the faulty storage location with error correction bits from a repair group of storage cells.

9. The memory device according to claim 8 wherein a partial-write access to the first group of storage locations sets the state of the error enable bit such that the error information is invalid.

10. The memory device according to claim 8 wherein the error information comprises an error detection code.

11. The memory device according to claim 8 wherein the error information comprises an error correction code.

12. The memory device according to claim 8 wherein the error information includes the error enable bit.

13. The memory device according to claim 9 wherein the first group of storage locations comprises an addressable column of storage cells, and the partial-write access comprises a masked-write operation to less than all of the first group of storage locations.

14. The memory device according to claim 8 further comprising:
   error code circuitry to generate an error syndrome using the data in the first group of storage locations; and
   circuitry to load the error syndrome as the error information into an extended area of storage locations in the memory device that correspond to the first group of storage locations.

15. An integrated circuit (IC) chip, comprising:
   a first group of storage locations in the IC chip to store data;
   a second group of storage locations in the IC chip to store error information associated with the stored data;
   logic to evaluate the validity of the error information based on a state of an error enable bit, the state based on whether a most recent access to the first group of storage locations involved a partial access; and
   repair logic to
      identify a faulty storage location based on the error information,
      store an address corresponding to the faulty storage location, and
      repair the faulty storage location for subsequent accesses by augmenting data stored in the faulty storage location with error correction bits from a repair group of storage cells.

16. The IC chip according to claim 15, wherein the IC chip is embodied as a dynamic random access memory (DRAM) device.

17. The IC chip according to claim 15, wherein the error information comprises one selected from the group consisting of an error detection code, an error correction code, and the error enable bit.

18. The IC chip according to claim 15, wherein the first group of storage locations comprises an addressable column of storage cells, and the partial-write access comprises a masked-write operation to less than all of the first group of storage locations.

* * * * *